(12) United States Patent
Cosley et al.

(10) Patent No.: US 12,448,758 B2
(45) Date of Patent: *Oct. 21, 2025

(54) APPLIANCE OUTLET BOX

(71) Applicant: RELIANCE WORLDWIDE CORPORATION, Atlanta, GA (US)

(72) Inventors: James Wittmer Cosley, Ramona, CA (US); Dennis L. Hart, Reno, NV (US); Virgil E. O'Neil, San Diego, CA (US)

(73) Assignee: Reliance Worldwide Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,569

(22) Filed: Jun. 28, 2024

(65) Prior Publication Data
US 2024/0352716 A1 Oct. 24, 2024

Related U.S. Application Data

(63) Continuation of application No. 17/811,231, filed on Jul. 7, 2022, now Pat. No. 12,077,950.
(Continued)

(51) Int. Cl.
E03B 7/09 (2006.01)
E03C 1/02 (2006.01)
F16L 5/10 (2006.01)

(52) U.S. Cl.
CPC .............. *E03C 1/021* (2013.01); *E03B 7/095* (2013.01); *F16L 5/10* (2013.01); *E03C 2001/028* (2013.01); *Y10T 137/698* (2015.04)

(58) Field of Classification Search
CPC ...... Y10T 137/698; E03B 7/095; F16L 3/105; F16L 3/1211; E03C 1/021; E03C 2001/028

See application file for complete search history.

(56) References Cited

U.S. PATENT DOCUMENTS

| | | | |
|---|---|---|---|
| 1,196,928 | A | 9/1916 | Bylund |
| 2,109,344 | A | 2/1938 | Selger |

(Continued)

FOREIGN PATENT DOCUMENTS

| | | |
|---|---|---|
| CA | 1321079 | 8/1993 |
| CA | 2592623 | 10/2000 |

(Continued)

OTHER PUBLICATIONS

Office Action; U.S. Appl. No. 18/183,744; Jun. 28, 2024.
(Continued)

*Primary Examiner* — Kevin F Murphy
(74) *Attorney, Agent, or Firm* — Barnes & Thornburg LLP

(57) ABSTRACT

An outlet box assembly includes an outlet box housing, configurable between a first and second orientation, and a funnel assembly. The outlet box housing includes a first wall portion and a second wall portion. The first wall portion includes a first socket portion, including a first knock out portion, and at least one through hole. The first knock out portion includes a first knock out body and an area of weakening. The through hole attaches a plumbing fitting to the first wall portion. The second wall portion includes a second socket portion including a second knock out portion including a second knock out body and an area of weakening. The funnel assembly has a fixed funnel portion and a funnel cover configured to be removably attached to the fixed funnel portion. The funnel assembly is configured to direct fluid to the first or second socket portion.

5 Claims, 24 Drawing Sheets

Related U.S. Application Data

(60) Provisional application No. 63/219,640, filed on Jul. 8, 2021.

(56) References Cited

U.S. PATENT DOCUMENTS

| | | | |
|---|---|---|---|
| 2,331,020 A | 10/1943 | Frances | |
| 2,628,799 A | 2/1953 | Aaby | |
| 3,494,373 A | 2/1970 | Horak et al. | |
| 3,495,276 A | 2/1970 | Suess | |
| 3,862,433 A | 1/1975 | Rousselet | |
| 4,008,824 A | 2/1977 | Renoux | |
| 4,158,471 A | 6/1979 | Logsdon | |
| 4,564,249 A | 1/1986 | Logsdon | |
| 4,716,925 A | 1/1988 | Prather | |
| 4,865,072 A | 9/1989 | Logsdon | |
| 4,934,410 A | 6/1990 | Humber et al. | |
| 5,155,957 A | 10/1992 | Robertson et al. | |
| 5,261,444 A | 11/1993 | Childers | |
| 5,305,785 A | 4/1994 | Humber | |
| 5,931,200 A | 8/1999 | Mulvey et al. | |
| 5,983,923 A | 11/1999 | Hobbs et al. | |
| 6,125,881 A | 10/2000 | Hobbs et al. | |
| 6,129,109 A | 10/2000 | Humber | |
| 6,148,850 A | 11/2000 | Kopp et al. | |
| 6,155,286 A | 12/2000 | Geary | |
| 6,234,193 B1 | 5/2001 | Hobbs et al. | |
| D474,483 S | 5/2003 | Humber et al. | |
| 6,629,676 B1 | 10/2003 | Gretz | |
| 6,695,001 B2 | 2/2004 | Dicosola | |
| 7,077,156 B1 | 7/2006 | Humber et al. | |
| 7,193,153 B2 | 3/2007 | Hemingway et al. | |
| 7,270,144 B2 | 9/2007 | Minnick et al. | |
| 7,357,148 B1 | 4/2008 | Gibson | |
| 7,360,553 B1 | 4/2008 | Ismert | |
| D570,292 S | 6/2008 | Schulz | |
| 7,614,419 B2 | 11/2009 | Minnick et al. | |
| 7,735,511 B1 | 6/2010 | Ismert | |
| 7,854,337 B1 | 12/2010 | Ismert et al. | |
| D635,098 S | 3/2011 | Ismert | |
| 7,963,567 B2 * | 6/2011 | Gallardo | F16L 5/08 285/139.3 |
| 8,020,581 B1 | 9/2011 | Julian et al. | |
| 8,061,390 B2 | 11/2011 | Condon et al. | |
| 8,141,831 B2 | 3/2012 | Julian et al. | |
| 8,434,587 B2 | 5/2013 | Era et al. | |
| D721,041 S | 1/2015 | Badowski | |
| 9,022,326 B2 | 5/2015 | Brown et al. | |
| 9,057,460 B2 | 6/2015 | Ismert et al. | |
| D749,521 S | 2/2016 | Badowski | |
| 9,290,917 B2 | 3/2016 | Condon et al. | |
| 9,388,555 B2 | 7/2016 | Whitehead et al. | |
| 9,394,674 B2 | 7/2016 | Whitehead et al. | |
| 9,518,381 B2 | 12/2016 | Whitehead et al. | |
| 9,534,709 B2 | 1/2017 | Wilson et al. | |
| 9,650,765 B2 | 5/2017 | Whitehead et al. | |
| 9,650,766 B2 | 5/2017 | Whitehead et al. | |
| 9,725,892 B2 | 8/2017 | Ismert et al. | |
| 10,060,102 B2 | 8/2018 | Zahuranec et al. | |
| 10,190,706 B2 | 1/2019 | Mentink | |
| 10,683,645 B2 | 6/2020 | Brown et al. | |
| 10,865,550 B1 | 12/2020 | Sampson | |
| 10,975,983 B2 | 4/2021 | Zhang et al. | |
| 11,473,276 B2 | 10/2022 | Ismert | |
| 12,077,950 B2 * | 9/2024 | Cosley | E03C 1/021 |
| 2004/0112433 A1 | 6/2004 | Dicosola | |
| 2005/0229304 A1 | 10/2005 | Doverspike | |
| 2008/0190505 A1 | 8/2008 | Condon et al. | |
| 2008/0265571 A1 | 10/2008 | Gallardo et al. | |
| 2010/0000614 A1 | 1/2010 | Zahuranec et al. | |
| 2011/0210222 A1 | 9/2011 | van Walraven | |
| 2012/0061529 A1 | 3/2012 | Hill | |
| 2014/0263867 A1 | 9/2014 | Brown et al. | |
| 2014/0352798 A1 | 12/2014 | Clarke et al. | |
| 2015/0225931 A1 | 8/2015 | Zahuranec et al. | |
| 2015/0259891 A1 | 9/2015 | Ismert et al. | |
| 2019/0360181 A1 | 11/2019 | O'Neill et al. | |
| 2023/0011516 A1 | 1/2023 | Cosley et al. | |
| 2023/0212840 A1 | 7/2023 | Cosley | |

FOREIGN PATENT DOCUMENTS

| | | |
|---|---|---|
| CA | 2770019 A1 | 3/2013 |
| CA | 2914207 | 12/2014 |
| CA | 2877399 | 1/2015 |
| CA | 2892865 | 5/2015 |
| DE | 102008061269 A1 | 6/2009 |
| DE | 102017123765 A1 | 4/2019 |
| JP | H09228633 A | 9/1997 |
| KR | 20180094649 A | 8/2018 |
| WO | 2014197621 A1 | 12/2014 |
| WO | 2018064609 A1 | 4/2018 |

OTHER PUBLICATIONS

IPS Corporation; Right hand Wide Mouth Outlet Boxes; 2 pages; published May 2018 at ipsplumbingproducts.com.
Oatey; 2020 Product Catalog; Oatey 2x4 Washing Machine Outlet Boxes; 1 page; published Jun. 2020 at fliphtml5. com.
Oatey; 2020 Product Catalog; Oatey Eliminator Washing Machine Outlet Boxes; 1 page; published Jun. 2020 at fliphtml5.com.
Sioux Chief; Ox Box Outlet Box System Brochure; 20 pages; published Nov. 11, 2022, at www.siouxchief.com.
Office Action; U.S. Appl. No. 17/730,059; Mar. 11, 2024.
Search Report and Written Opinion; International Patent Application No. PCT/US2022/036405; Oct. 25, 2022.
International Search Report and Written Opinion; International Patent Application No. PCT/US2024/019693; Jul. 15, 2024.
Supplementary Partial EP Search Report in EP Appln No. 22838427.7, dated May 20, 2025.
1 Supplementary Search Report in EP Application No. 22796567.0, mailed Feb. 17, 2025.

* cited by examiner

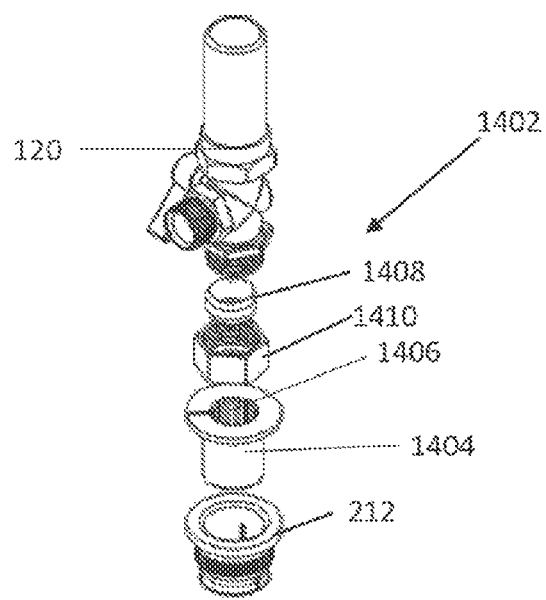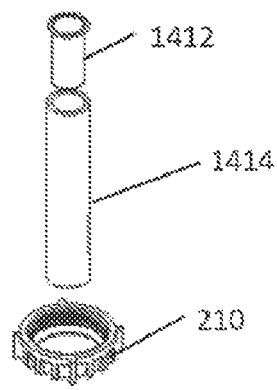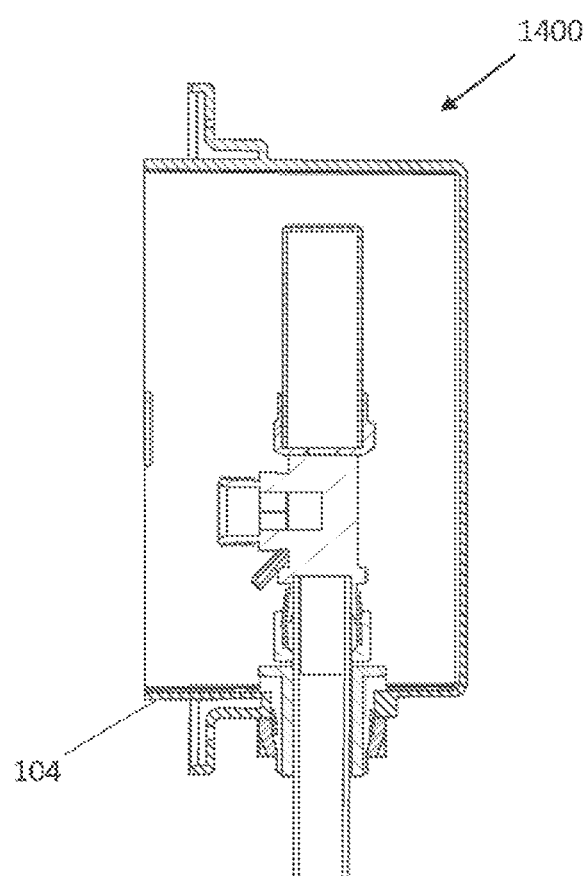
FIG. 14A
FIG. 14B

FIG. 31
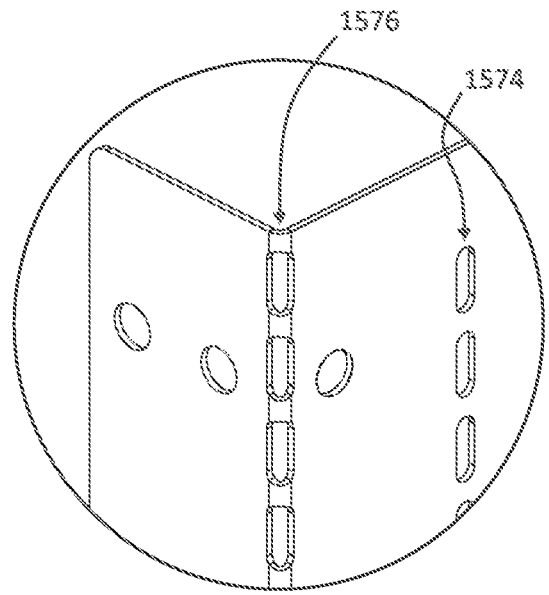
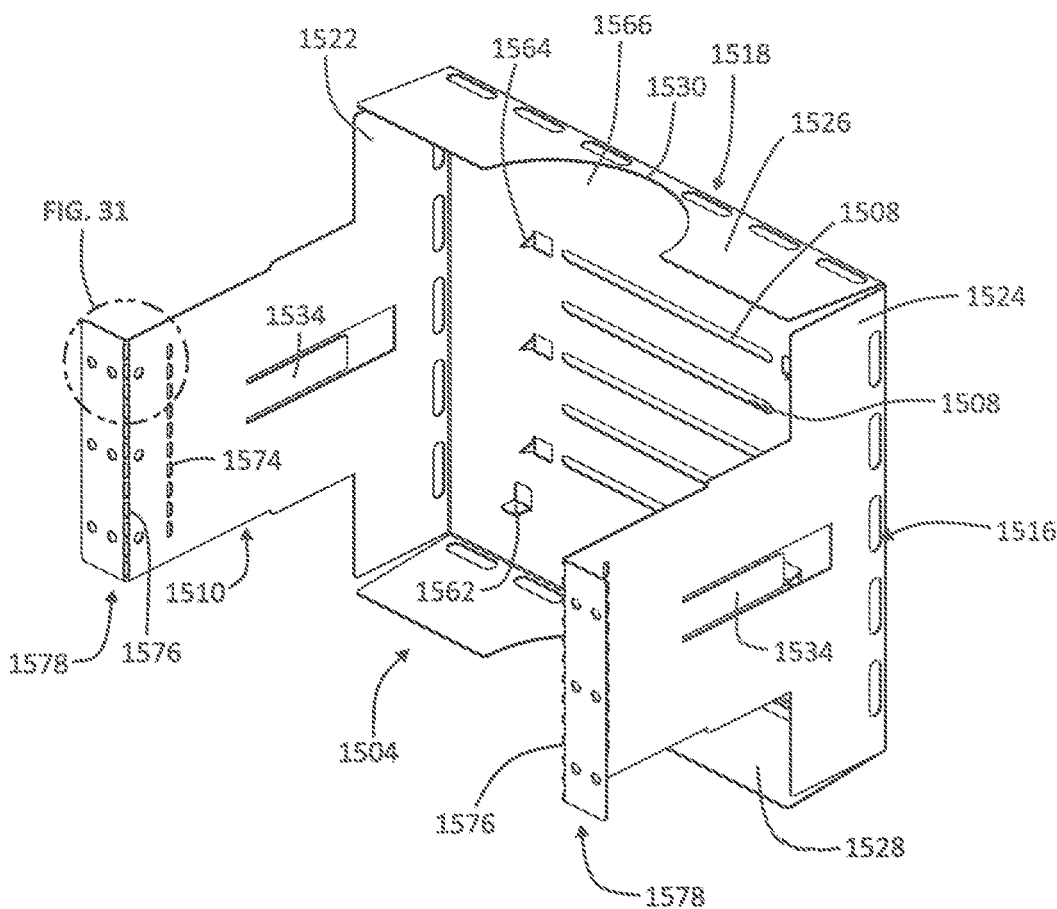
FIG. 30

APPLIANCE OUTLET BOX

CROSS-REFERENCE TO RELATED APPLICATION

This application is a continuation of U.S. patent application Ser. No. 17/811,231, filed Jul. 7, 2022, which claims the benefit of U.S. Provisional Application No. 63/219,640, filed Jul. 8, 2021.

INCORPORATION BY REFERENCE

U.S. patent application Ser. No. 17/811,231, filed Jul. 7, 2022, and U.S. Provisional Application No. 63/219,640, filed Jul. 8, 2021 are hereby incorporated by reference as if set forth in their entireties.

FIELD

The present application relates generally to appliance outlet boxes.

BACKGROUND

Appliance outlet boxes are used in the market for installation of appliances. For example, outlet boxes are used when installing appliances such as washing machines, refrigerators, and dish washers. There is further need in the market for appliance outlet boxes that can be used for installation of water heaters. Existing appliance outlet boxes do not provide cost affordable drainage options for condensate and temperature and pressure relief drain lines nor the ability to easily configure drain funnels with outlet box drains and inlet piping. Also, existing appliance outlet boxes do not provide acoustic isolation and need a solution to reduce the transfer of plumbing noise and vibration in occupied spaces. Additionally, existing appliance outlet boxes do not provide adequate structural support and need more rigid brackets for support.

SUMMARY

Various implementations provide for an outlet box assembly that includes an outlet box housing and a funnel assembly. The outlet box housing includes a first wall portion and a second wall portion. The first wall portion includes a first socket portion and at least one through hole. The first socket portion is configured for receipt of at least a portion of a conduit and includes a first knock out portion. The first knock out portion includes a first knock out body and an area of weakening disposed to connect the first knock out body to the first wall portion and configured to facilitate removal of the first knock out body from the first wall portion. The through hole is configured to facilitate attachment of a plumbing fitting to the first wall portion. The second wall portion includes a second socket portion configured for receipt of at least a portion of tubing and including a second knock out portion. The second knock out portion includes a second knock out body and an area (or line) of weakening disposed to connect the second knock out body to the second wall portion.

The funnel assembly includes a stationary/fixed funnel portion extending between the first wall portion and the second wall portion and a funnel cover configured to be removably attached to the stationary/fixed funnel portion. The funnel assembly defines an opening configured to allow passage of at least a portion of a conduit into the outlet box housing, and is configured to direct fluid flow to the first socket portion or the second socket portion. The outlet box housing is configurable between a first orientation, in which the first wall portion defines a bottom wall of the outlet box housing and the second wall portion defines a top wall of the outlet box housing, and a second orientation, in which the second wall portion is positioned opposite the first wall portion and the second wall portion defines a bottom wall of the outlet box housing and the first wall portion defines a top wall of the outlet box housing.

Various other implementations provide for an outlet box assembly that includes an outlet box housing. The outlet box housing includes a first wall portion and a second wall portion. The first wall portion includes a first socket portion and at least one through hole. The first socket portion is configured for receipt of at least a portion of a conduit and includes a first knock out portion. The first knock out portion includes a first knock out body and an area of weakening disposed to connect the first knock out body to the first wall portion and is configured to facilitate removal of the first knock out body from the first wall portion. The through hole is configured to facilitate attachment to a plumbing fitting using a collet assembly (e.g., an attachment or locking assembly) configured to attach the plumbing fitting to the outlet box housing.

The collet assembly includes a nut and a collet body. The nut includes an inner surface that defines a passage with one or more internal threads positioned along the inner surface. The collet body includes one or more external threads configured to engage with the one or more internal threads of the nut and defines a longitudinally-extending collet body through hole configured to receive a plumbing fitting. The collet body further defines at least one longitudinal slot configured to allow the collet body to radially compress when the collet body is attached to the nut. The second wall portion includes a second socket portion configured for receipt of at least a portion of tubing and including a second knock out portion. The second knock out portion includes a second knock out body and an area of weakening disposed to connect the second knock out body to the second wall portion. The outlet box housing is configurable between a first orientation, in which the first wall portion defines a bottom wall of the outlet box housing and the second wall portion defines a top wall of the outlet box housing, and a second orientation, in which the second wall portion is positioned opposite the first wall portion and the second wall portion defines a bottom wall of the outlet box housing and the first wall portion defines a top wall of the outlet box housing.

Various other implementations provide for a method of assembling an outlet box. The method includes inserting a collet body into a through hole of a first wall portion, engaging one or more internal threads of a nut with the one or more external threads of the collet body, and radially compressing the collet body along the at least one longitudinal slot with the nut. The collet body includes one or more external threads and defines a longitudinally-extending collet body through hole configured to receive one of a plumbing fitting. The collet body further defines at least one longitudinal slot. The nut includes an inner surface that defines a passage with the one or more internal threads positioned along the inner surface.

Various other implementations provide for an outlet box assembly that includes a housing defined by a first wall portion and a second wall portion. The first wall portion and the second wall portion include a first socket portion, a second socket portion, and a funnel cover. The first socket portion is provided on the first wall portion and configured to be coupled to a conduit when the housing is in a first orientation. The second socket portion is provided on the second wall portion and configured to be coupled to the conduit when the housing is in a second orientation. The funnel cover is sized for inserting in the first socket portion or the second socket portion and sized for receiving a hose passing into the funnel cover, through the first socket portion or the second socket portion, and into the conduit.

Various other implementations provide for an outlet box assembly that includes an outlet box housing. The outlet box housing includes at least one hole configured to facilitate attachment of a plumbing fitting and an elastomeric gasket of a predetermined thickness and a predetermined stiffness to isolate the plumbing fitting and reduce transmission of noise and vibration.

Various other implementations provide for an outlet box assembly that includes an outlet box housing. The outlet box housing includes at least two holes configured to facilitate attachment of plumbing fittings with outlet ends substantially perpendicular to the inlet ends. The outlet sides of said plumbing fitting have ¾" or larger male tapered pipe threads wherein one plumbing fitting is an elbow fitting and the other plumbing fitting is a valve.

Various other implementations provide for an outlet box assembly that includes an outlet box housing. The outlet box assembly includes an intumescent fire wrap support bracket that includes a back face with retainers for supporting an intumescent material and side faces that extend from the back face through a wall.

These and other features together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 14A is an exploded view of a valve assembly of an outlet box assembly according to another embodiment.

FIG. 14B is a side view of the outlet box assembly of FIG. 14A.

FIG. 30 is a perspective view of the intumescent fire wrap support bracket of FIG. 25 showing the distal end tabs in a second folded position for mounting within a double wall structure.

FIG. 31 is an enlarged view of a portion of FIG. 30.

DETAILED DESCRIPTION

Referring to the figures generally, various implementations disclosed herein relate to appliance outlet box assemblies. The appliance outlet box assemblies disclosed herein improve the ease and quality of installation of appliances, such as the installation of water heaters or washing machines, and reduce the installation time for end users.

Figure 1:
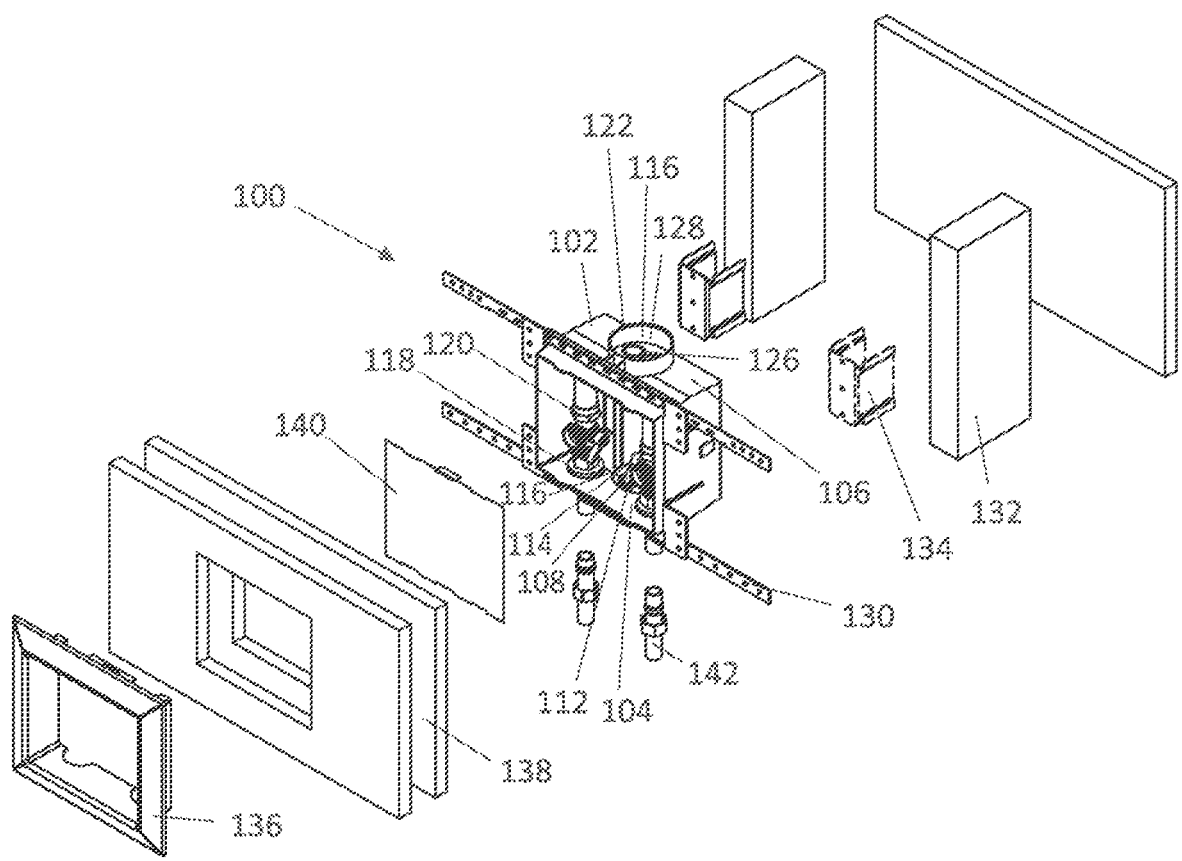
FIG. 1 is an exploded view of an outlet box assembly according to one embodiment.

FIGS. 1-6B show an outlet box assembly 100 according to one embodiment. FIG. 1 shows the outlet box assembly 100 that includes an outlet box housing 102. The outlet box housing 102 includes a first wall portion 104 and a second wall portion 106. The first wall portion 104 includes a first socket portion 108 that is configured for receipt of a conduit. The first socket portion 108 includes a first knock out portion 112. The first knock out portion 112 includes a first knock out body 114 and an area (or line) of weakening 116. The area (or line) of weakening 116 is disposed to connect the first knock out body 114 to the first wall portion 104 and is configured to facilitate removal of the first knock out body 114 from the first wall portion 104. The first wall portion 104 also includes a through hole 118 that is configured to facilitate attachment of a plumbing fitting 120 to the first wall portion 104. Speaking generally once a drain pipe is attached, it is then pressure tested with the knock-out bodies in place, which are sufficiently strong to allow for pressure testing but frangible enough to be easily removed. In some embodiments, the knock-out bodies may be made of styrene, acrylonitrile butadiene styrene (ABS), fire rated ABS, PVC, combinations of the foregoing, or alternative materials.

The plumbing fitting 120 includes an inlet 142 and at least one of a metal tube, a plastic tube, a plastic fitting, or a metal fitting. The second wall portion 106 includes a second socket portion 122 that is configured for receipt of a conduit. The second socket portion 122 includes a second knock out portion 126. The second knock out portion 126 includes a second knock out body 128 and an area (or line) of weakening 116. The area (or line) of weakening 116 is disposed to connect the second knock out body 128 to the second wall portion 106 and is configured to facilitate removal of the second knock out body 128 from the second wall portion 106. The first knock out body 114 and the second knock out body 128 are configured to be removed from the respective first wall portion 104 and the second wall portion 106 upon application of an external force. The first and second knock out bodies 114, 128 allow for coverage of a drain in a manner that permits ready removal for pressure testing during the rough-in phase of installation.

Further, the outlet box assembly 100 includes at least one mounting flange 130 that is configured to attach to at least one stud 132 using a bracket 134. Additionally, the outlet box assembly 100 includes a frame 136 and may be configured to attach to drywall 138. The outlet box assembly 100 also includes a cover 140 that is configured to attach to the outlet box housing 102 and located on the opposite side of the drywall 138 as the frame 136. Additionally, in some implementations, the outlet box housing 102 including the first wall portion 104, the second wall portion 106, and the surface of the outlet box assembly 100 are internally sloped (tapered) to direct any fluid that may enter the outlet box assembly 100 to drain toward at least one of the first socket portion 108 or the second socket portion 122. The extent of sloping (angle of inclination) may vary according to different implementations. In some embodiments, the slope may be angled from about 1 degree to about 15 degrees. Various features will be discussed in more detail below.

Figure 2:
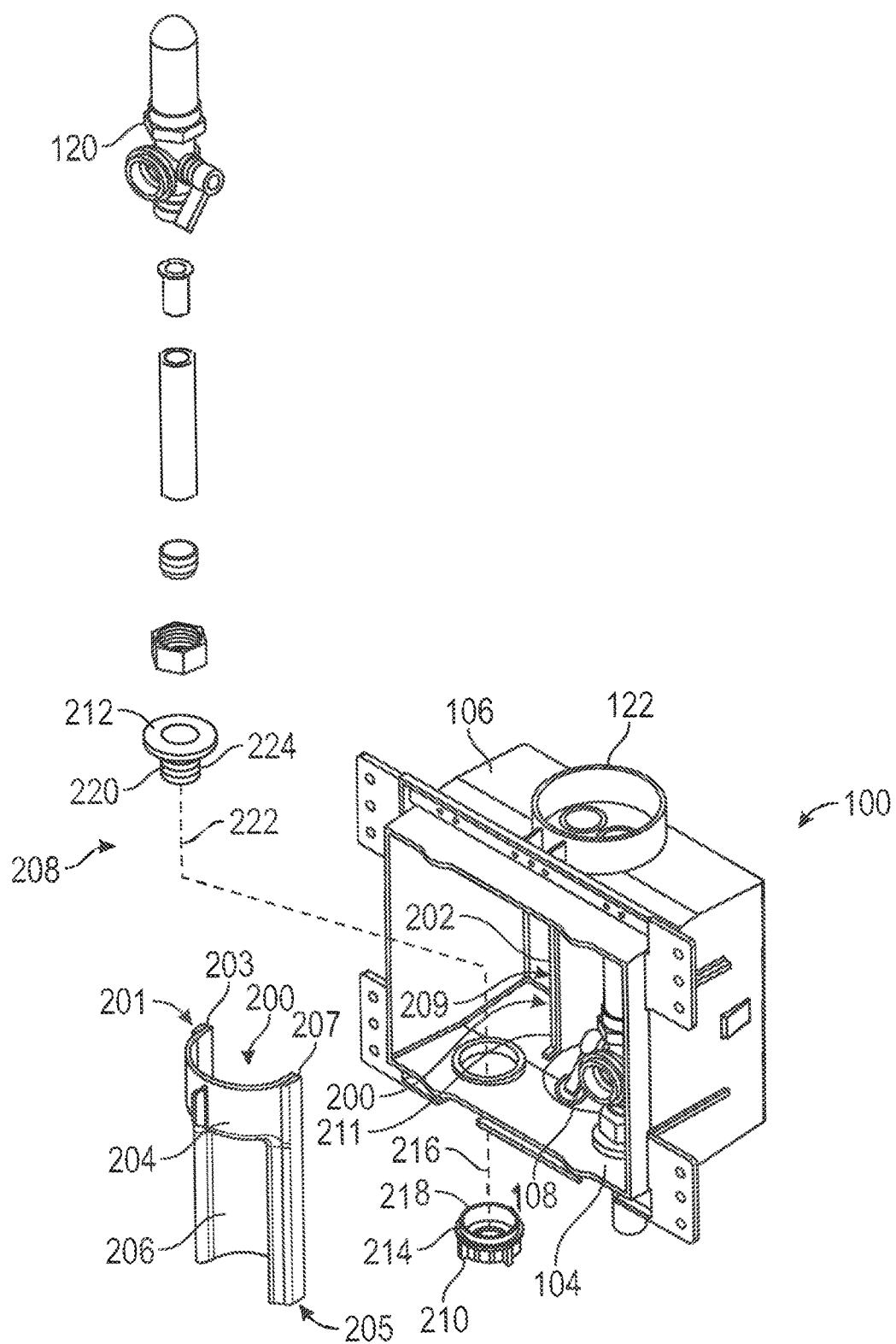
FIG. 2 is an exploded view of a valve assembly of the outlet box assembly of FIG. 1.
Figure 3A:
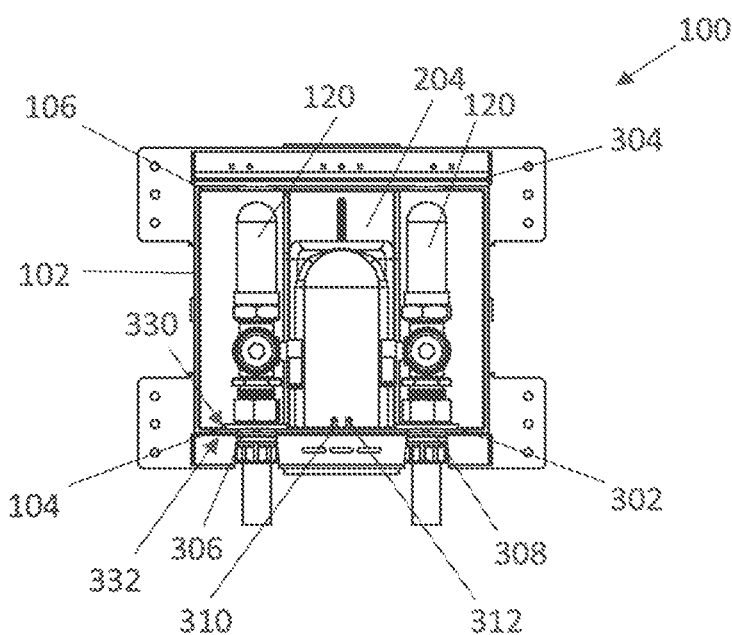
FIG. 3A is a front view of the outlet box assembly of FIG. 1.
Figure 3B:
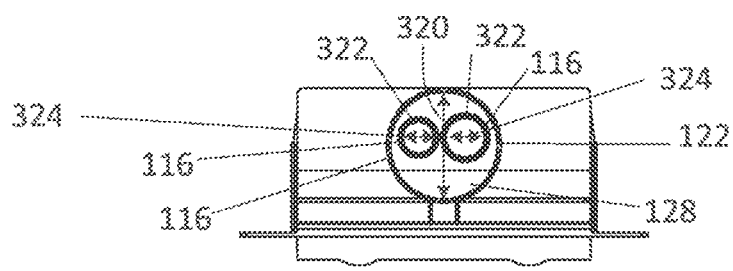
FIG. 3B is a top view of the outlet box assembly of FIG. 1.
Figure 3C:
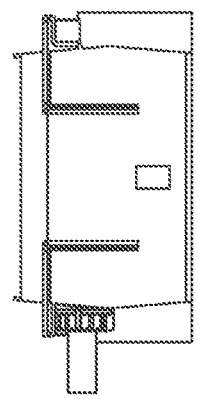
FIG. 3C is a right side view of the outlet box assembly of FIG. 1.
Figure 3D:
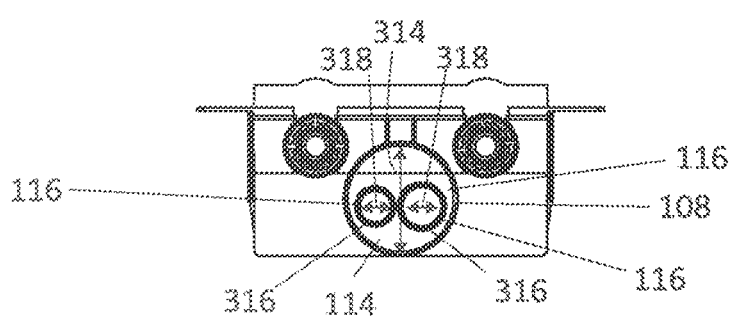
FIG. 3D is a bottom view of the outlet box assembly of FIG. 1.
Figure 3E:
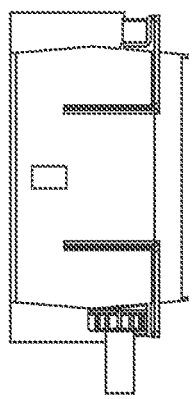
FIG. 3E is a left side view of the outlet box assembly of FIG. 1.

FIG. 2 shows the outlet box assembly 100 that includes a funnel assembly 200. The funnel assembly 200 includes a stationary/fixed funnel portion 202 that extends between the first wall portion 104 and the second wall portion 106. The funnel assembly 200 also includes a funnel cover 204 that is configured to be removably attached to the stationary/fixed funnel portion 202. The funnel assembly 200 defines an opening/passage 206 that is configured to direct fluid flow to the first socket portion 108 or the second socket portion 122. Speaking generally the wall portions (e.g., wall portions 104, 106), together with the funnel portion 202 and its associated funnel cover 204 serve as an air gap to prevent siphoning and back flow of the drainage into a potable water supply. Specifically, the wall portions 104, 106 and the funnel portion 202 prevent the falling water from the water draining from the upper conduits from spraying out of the outlet box housing 102 into the conduit.

Further, as seen in FIG. 2, a plumbing fitting 120 is configured to attach to the first wall portion 104 by a collet assembly 208. The collet assembly 208 includes a nut 210 and a collet body 212. The nut 210 includes an inner surface 214 that defines a passage 216 with one or more internal threads 218 positioned along the inner surface 214. The collet body 212 includes one or more external threads 220 that are configured to engage with the one or more internal threads 218 of the nut 210. The collet body 212 defines a longitudinally-extending collet body through hole 222 that is configured to receive a plumbing fitting 120. The collet body 212 further defines at least one longitudinal slot 224 that is configured to allow the collet body 212 to radially compress when the collet body 212 is attached to the nut 210. The collet body 212 may be configured with one or more tapered faces in some embodiments. The collet body 212 is configured to support approximately ¾" pipes in various implementations. In some implementations, alternative sizes of pipes may be retained by the collet body 212.

FIGS. 3A-3E show the outlet box assembly 100 in a first orientation in which the first wall portion 104 defines a bottom wall 302 of the outlet box housing 102 and the second wall portion 106 defines a top wall 304 of the outlet box housing 102. The funnel cover 204 is configured to direct fluid to either the first socket portion 108 or the second socket portion 122 in the first orientation. In particular, the funnel can be attached onto the outlet box housing 102 in either the first orientation or a second orientation as discussed below.

Further, as seen in FIGS. 3A-3E, the first wall portion 104 includes a first through hole 306 and a second through hole 308 which are configured to facilitate attachment of at least one plumbing fitting 120 to the first wall portion 104. The first through hole 306 and the second through hole 308 are positioned on the same wall portion or on the opposite wall portion as the socket portion (either the first socket portion 108 or the second socket portion 122) to which the funnel cover 204 is directing fluid. Further, the first through hole 306 and the second through hole 308 extend between an inner first wall portion side 330 and an outer first wall portion side 332 of the first wall portion 104. When the collet body 212 and the nut 210 are attached to the first wall portion 104, at least a portion of the collet body 212 extends along the inner first wall portion side 330 and at least a portion of the collet body 212 is positioned between the nut 210 and the outer first wall portion side 332.

Additionally, the first knock out body 114 and the second knock out body 128 each include a first extending tab 310 and a second extending tab 312 projected inside of the outlet box assembly 100. The first extending tab 310 and the second extending tab 312 are configured to introduce stress when compressed together to the area (or line) of weakening 116 which causes the area (or line) of weakening 116 to fracture. That is, the material at the line of weakening 116 is sufficiently frangible to be fractured upon application of moderate force, e.g., a manually exerted force. The fracture allows for the removal of at least one of the first knock out body 114 or the second knock out body 128. Additionally, the first knock out body 114 has a first diameter 314 and includes first sub-knock out bodies 316 having diameters 318 that are smaller than the first diameter 314. The first sub-knock out bodies 316 include an area (or line) of weakening 116 and are configured for removal from the first wall portion 104 upon application of an external force.

The second knock out body 128 has a second diameter 320 and includes second sub-knock out bodies 322 having diameters 324 that are smaller than the second diameter 320. The second sub-knock out bodies 322 include an area (or line) of weakening 116 and are configured for removal from the second wall portion 106 upon application of an external force. The first sub-knock out bodies 316 and the second sub-knock out bodies 322 are configured to receive a drain pipe or a condensate line. The sub-knock out bodies allow are readily removable and may be configured for use with ¾" copper and/or iron pipes, for example. The sub-knockout bodies may receive a condensate line for an air conditioner or may drain overflowing fluid from a water heater (e.g., from a temperature and pressure relief valve) to prevent the water heating from damage (e.g., from becoming too full and bursting).

Figure 4A:
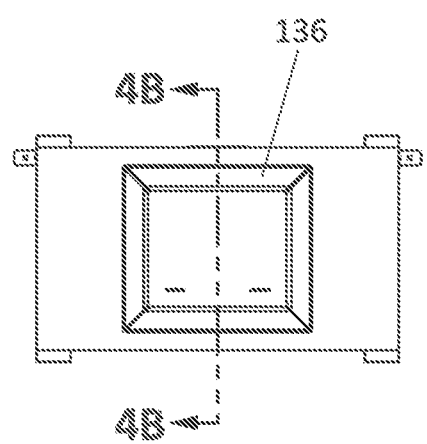
FIG. 4A is a front view of the outlet box assembly of FIG. 1.
Figure 4B:
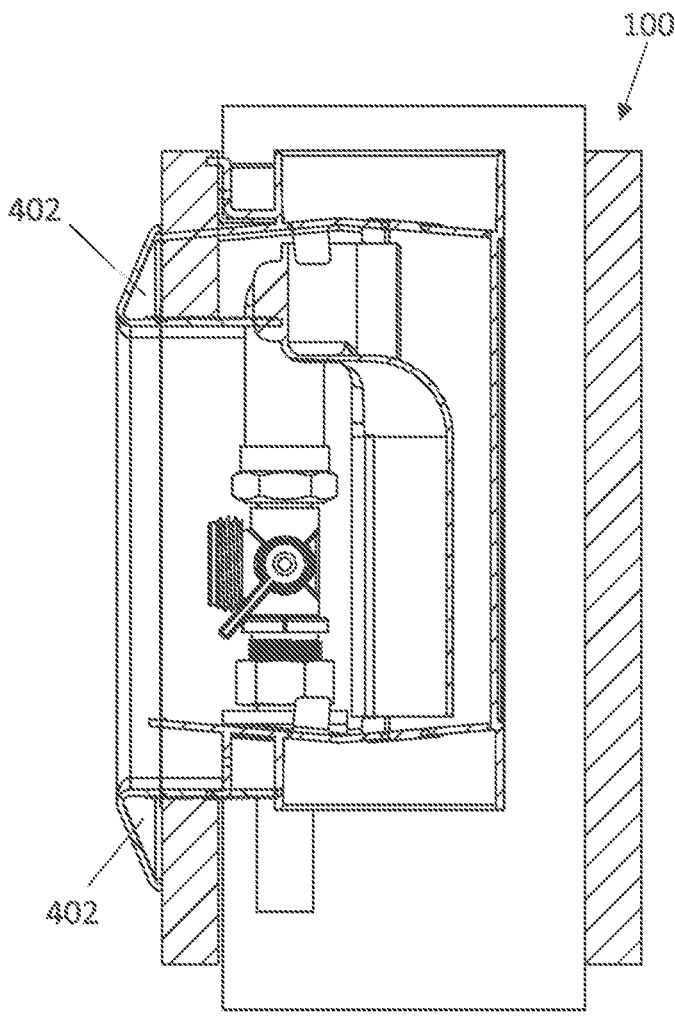
FIG. 4B is a cross-sectional view through section 4B-4B of FIG. 4A.
Figure 5A:
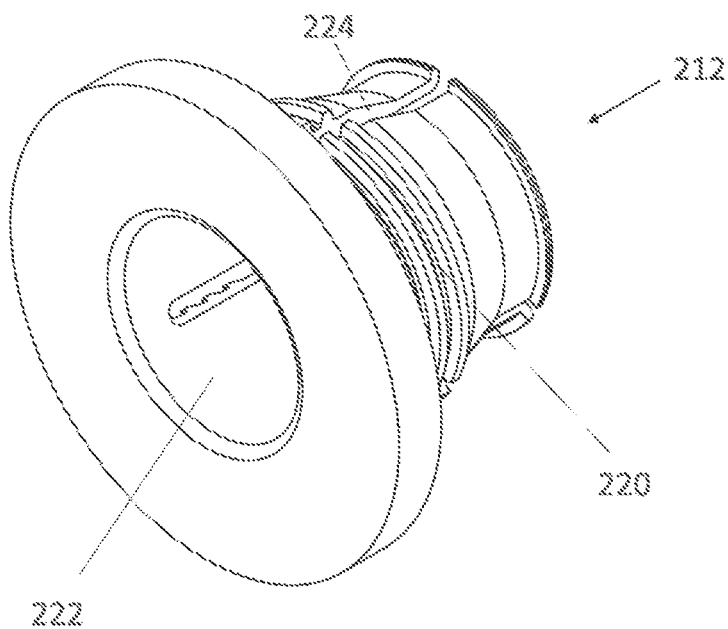
FIG. 5A is a front, perspective view of a collet body of the outlet box assembly of FIG. 1.
Figure 5B:
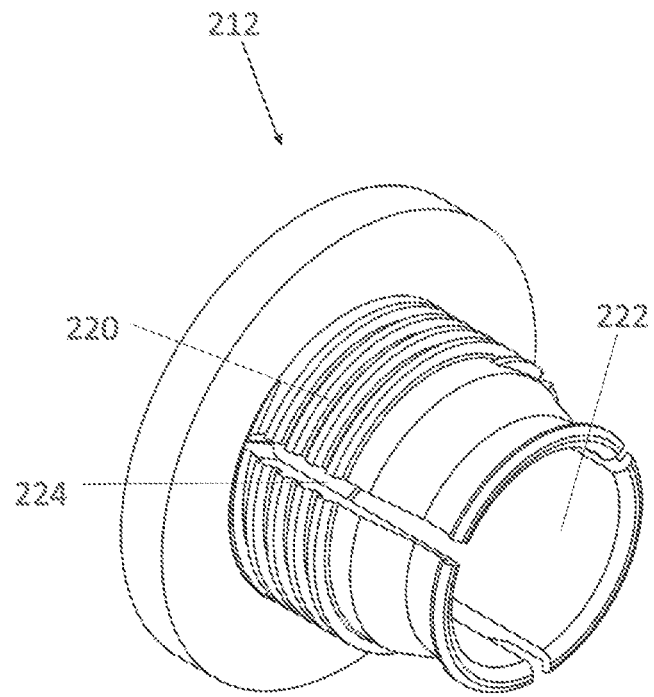
FIG. 5B is a back, perspective view of the collet body of FIG. 5A.

FIGS. 4A-4B show the outlet box assembly 100 that includes the frame 136 and attachment teeth 402 that are configured to mount to the outlet box assembly 100. The attachment teeth 402 are also configured to allow for adjustment to various drywall thicknesses. FIGS. 5A-5B show the collet body 212. The collet body 212 includes one or more external threads 220. The collet body 212 defines a longitudinally-extending collet body through hole 222. The collet body 212 further defines at least one longitudinal slot 224 that is configured to allow the collet body 212 to radially compress.

Figure 6A:
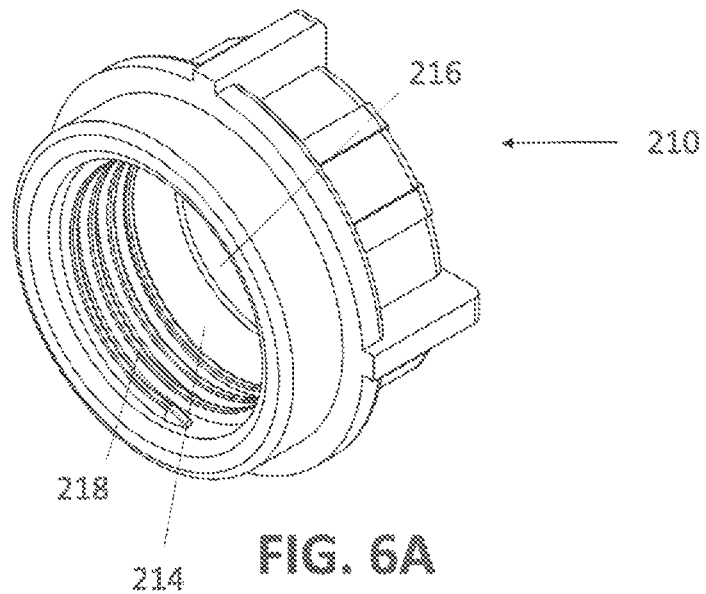
FIG. 6A is a front, perspective view of a nut of the outlet box assembly of FIG. 1.
Figure 6B:
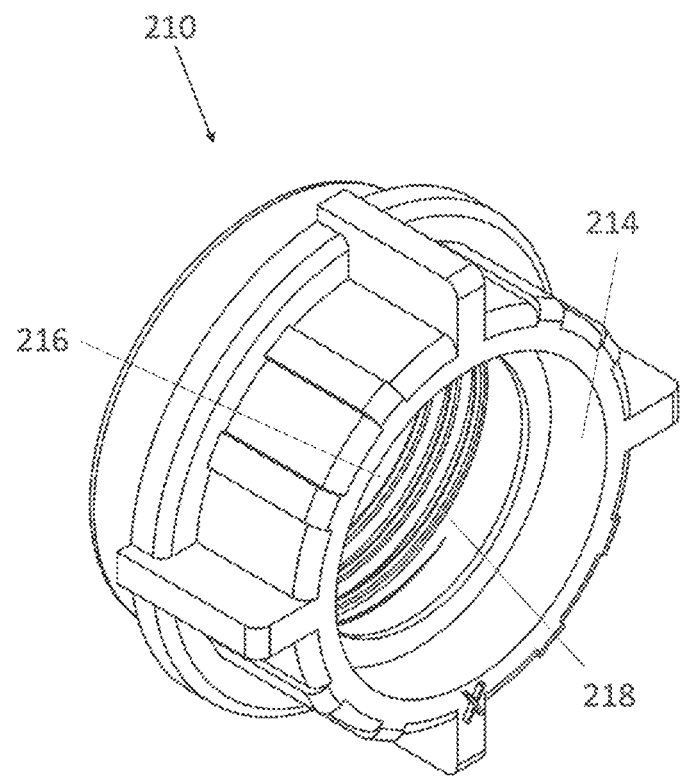
FIG. 6B is a back, perspective view of the nut of FIG. 6A.
Figure 7:
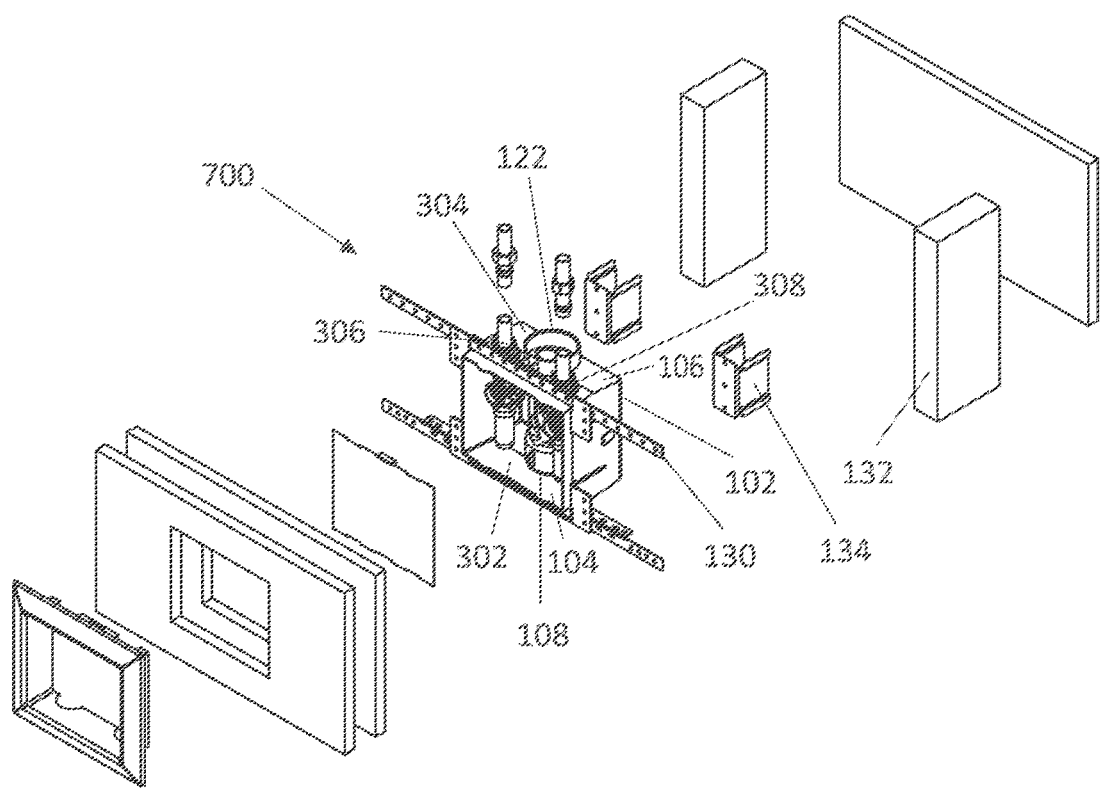
FIG. 7 is an exploded view of an outlet box assembly according to another embodiment.
Figure 8A:
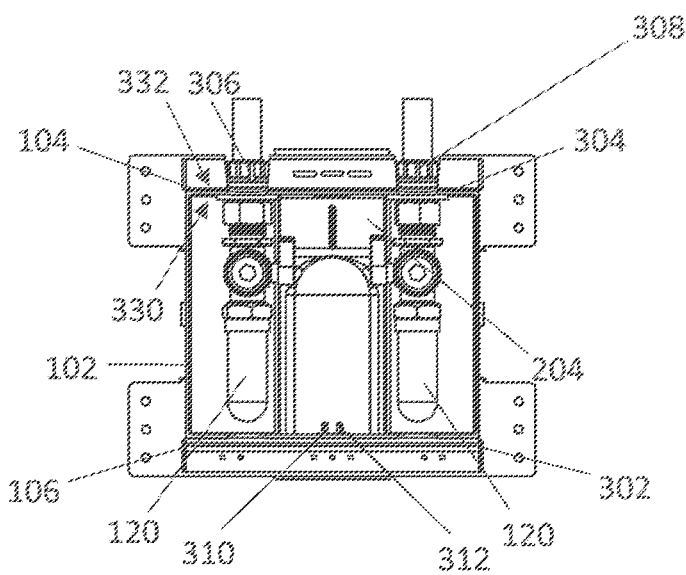
FIG. 8A is a front view of the outlet box assembly of FIG. 7.
Figure 8B:
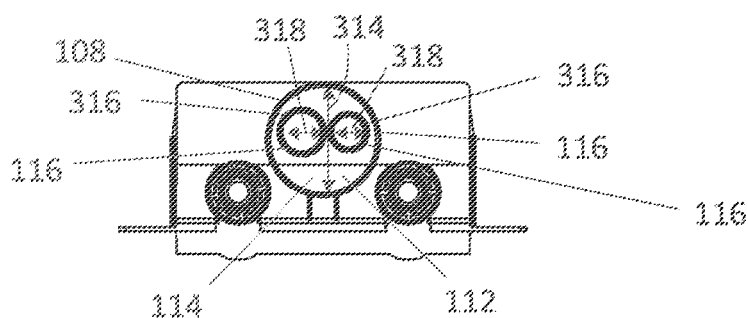
FIG. 8B is a top view of the outlet box assembly of FIG. 7.
Figure 8C:
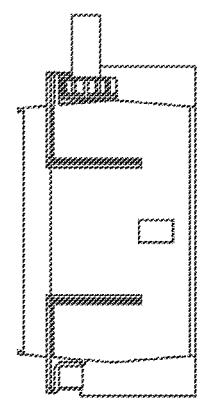
FIG. 8C is a right side view of the outlet box assembly of FIG. 7.
Figure 8D:
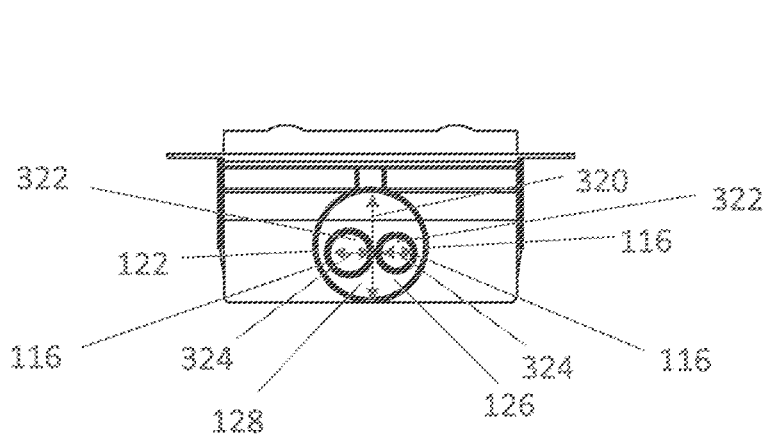
FIG. 8D is a bottom view of the outlet box assembly of FIG. 7.
Figure 8E:
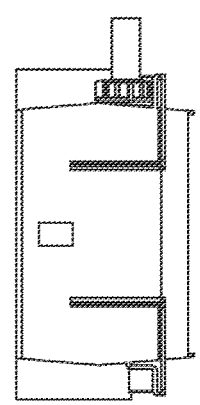
FIG. 8E is a left side view of the outlet box assembly of FIG. 7.

FIGS. 6A-6B show the nut 210. The nut 210 includes an inner surface 214 that defines a passage 216 with one or more internal threads 218 positioned along the inner surface 214. FIGS. 7-8E show an outlet box assembly 700 according to another embodiment. FIG. 7 depicts a second orientation in which the outlet box assembly 700 is rotated as compared to FIG. 1. FIG. 7 shows the outlet box assembly 700 that includes an outlet box housing 102. The outlet box housing 102 includes a first wall portion 104 and a second wall portion 106. The first wall portion 104, and thus the first through hole 306 and the second through hole 308, are located on the top wall 304 of the outlet box assembly 700 instead of the bottom wall 302 of the outlet box assembly 700. The first wall portion 104 also includes a first socket portion 108 that is configured for receipt of a conduit. The second wall portion 106 includes a second socket portion 122 that is configured for receipt of a conduit.

Further, it is shown that the outlet box assembly 700 includes at least one mounting flange 130 that is configured to attach to at least one stud 132 using the bracket 134. Additionally, the outlet box housing 102, including the first wall portion 104, the second wall portion 106, and the surface of the outlet box assembly 700, are internally sloped to direct any fluid that may enter the outlet box assembly 700 to drain toward at least one of the first socket portion 108 or the second socket portion 122.

FIGS. 8A-8E show the outlet box assembly 700 in a second orientation in which the first wall portion 104 defines a top wall 304 of the outlet box housing 102 and the second wall portion 106 defines a bottom wall 302 of the outlet box housing 102. The first wall portion 104 and the second wall portion 106 being adjustable between (i) a first orientation in which the first wall portion 104 is positioned opposite the second wall portion 106, the first wall portion 104 forming a bottom wall 302 and the second wall portion 106 forming a top wall 304, and (ii) a second orientation in which the second wall portion 106 is positioned opposite the first wall portion 104, the second wall potion 106 forming a bottom wall 302 and the first wall portion 104 forming a top wall 304. The funnel cover 204 is configured to direct fluid to either the first socket portion 108 or the second socket portion 122 in the second orientation. Thus, the funnel allows for greater leeway and flexibility in terms of orientation.

Additionally, as appreciated from FIGS. 8A-8E, the first socket portion 108 includes a first knock out portion 112. The first knock out portion 112 includes a first knock out body 114 and an area (or line) of weakening 116. The area (or line) of weakening 116 is disposed to connect the first knock out body 114 to the first wall portion 104 and is configured to facilitate removal of the first knock out body 114 from the first wall portion 104. The second socket portion 122 includes a second knock out portion 126. The second knock out portion 126 includes a second knock out body 128 and an area (or line) of weakening 116. The area (or line) of weakening 116 is disposed to connect the second knock out body 128 to the second wall portion 106 and is configured to facilitate removal of the second knock out body 128 from the second wall portion 106. The first knock out body 114 and the second knock out body 128 are configured to be removed from the respective first wall portion 104 and the second wall portion 106 upon application of an external force.

Further, in some implementations, the first wall portion 104 includes a first through hole 306 and a second through hole 308 which are configured to facilitate attachment of at least one plumbing fitting 120 to the first wall portion 104. The plumbing fitting 120 includes at least one of a metal tube, a plastic tube, a plastic fitting, or a metal fitting. The first through hole 306 and the second through hole 308 are positioned on the same wall portion or on the opposite wall portion as the socket portion (either the first socket portion 108 or the second socket portion 122) to which the funnel cover 204 is directing fluid. Additionally, the first through hole 306 and the second through hole 308 extend between an inner first wall portion side 330 and an outer first wall portion side 332 of the first wall portion 104. When the collet body 212 and the nut 210 are attached to the first wall portion 104, at least a portion of the collet body 212 extends along the inner first wall portion side 330 and at least a portion of the collet body 212 is positioned between the nut 210 and the outer first wall portion side 332.

Further, it is shown that the first knock out body 114 and the second knock out body 128 each include a first extending tab 310 and a second extending tab 312 projected inside of the outlet box assembly 700. The first extending tab 310 and the second extending tab 312 are configured to introduce stress when compressed together to the area (or line) of weakening 116 which causes the area (or line) of weakening 116 to fracture. The fracture allows for the removal of at least one of the first knock out body 114 or the second knock out body 128. Additionally, the first knock out body 114 has a first diameter 314 and includes first sub-knock out bodies 316 having diameters 318 that are smaller than the first diameter 314.

The first sub-knock out bodies 316 include an area (or line) of weakening 116 and are configured for removal from the first wall portion 104 upon application of an external force. The second knock out body 128 has a second diameter 320 and includes second sub-knock out bodies 322 having diameters 324 that are smaller than the second diameter 320. The second sub-knock out bodies 322 include an area (or line) of weakening 116 and are configured for removal from the second wall portion 106 upon application of an external force. The first sub-knock out bodies 316 and the second sub-knock out bodies 322 are configured to receive a drain pipe or a condensate line.

Figure 9:
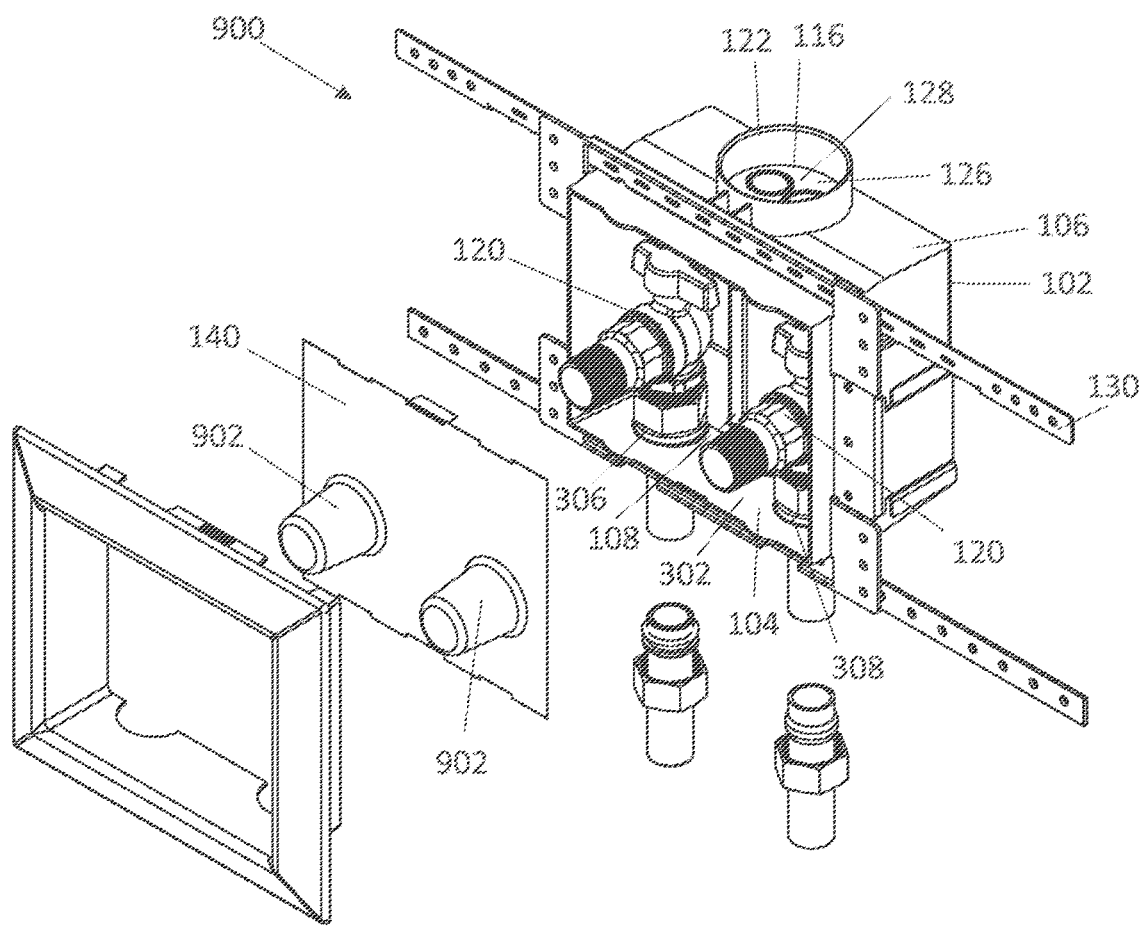
FIG. 9 is an exploded view of an outlet box assembly according to another embodiment.

FIGS. 9-13 show an outlet box assembly 900 according to another embodiment. FIG. 9 shows the outlet box assembly 900 that includes an outlet box housing 102. The outlet box housing 102 includes a first wall portion 104 and a second wall portion 106. The outlet box assembly 900 is shown in a first orientation in which the first wall portion 104, and therefore the first through hole 306 and the second through hole 308, are located on the bottom wall 302 of the outlet box assembly 900 similar to the orientation of the outlet box assembly 100 in FIG. 1.

Notably, FIG. 9 shows at least one plumbing fitting 120 that extends beyond the outlet box housing 102 and a cover 140 including at least one escutcheon 902. Further, the second wall portion 106 includes a second socket portion 122 that is configured for receipt of a conduit. The second socket portion 122 includes a second knock out portion 126. The second knock out portion 126 includes a second knock out body 128 and an area (or line) of weakening 116. The area (or line) of weakening 116 is disposed to connect the second knock out body 128 to the second wall portion 106 and is configured to facilitate removal of the second knock out body 128 from the second wall portion 106. The second knock out body 128 is configured to be removed from the second wall portion 106 upon application of an external force.

In addition, it is shown that the outlet box assembly 900 includes at least one mounting flange 130. In some implementations, the outlet box housing 102, including the first wall portion 104, the second wall portion 106, and the surface of the outlet box assembly 900, are internally sloped to direct any fluid that may enter the outlet box assembly 900 to drain toward at least one of the first socket portion 108 or the second socket portion 122. The extent of sloping/tapering may vary depending on various installation configurations.

Figure 10:
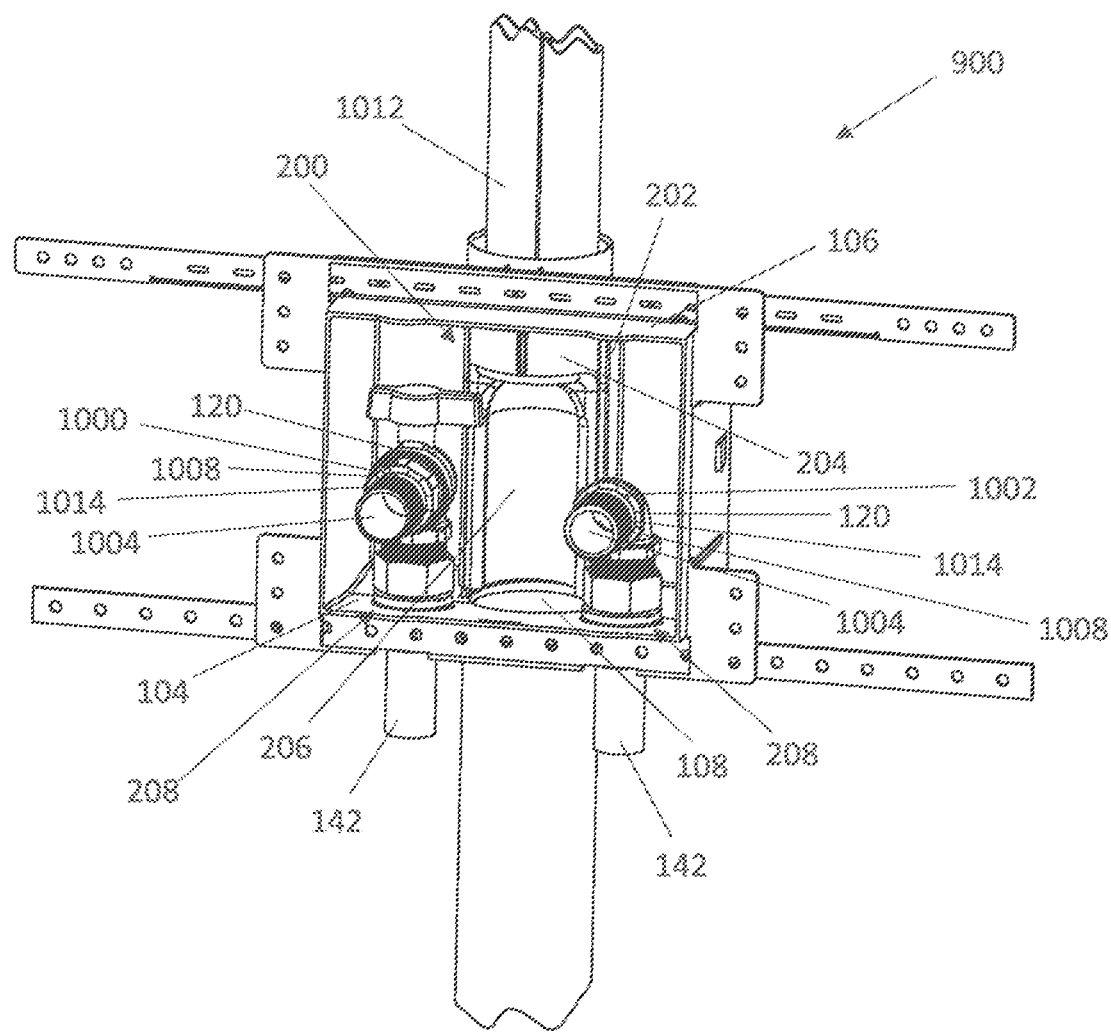
FIG. 10 is a perspective view of a valve and elbow assembly with drains of the outlet box assembly of FIG. 9.

FIG. 10 shows the outlet box assembly 900 that includes a funnel assembly 200. The funnel assembly 200 includes a stationary/fixed funnel portion 202 that extends between the first wall portion 104 and the second wall portion 106. The funnel assembly 200 also includes a funnel cover 204 that is configured to be removably attached to the stationary/fixed funnel portion 202. The funnel assembly 200 defines an opening/passage 206 that is configured to direct fluid flow to the first socket portion 108 or the second socket portion 122. The first socket portion 108 and the second socket portion 122 are configured for receipt of a conduit 1012. Further, a plumbing fitting 120 is configured to attach to the first wall portion 104 by a collet assembly 208.

In various implementations, the plumbing fitting 120 includes at least one of a compression style valve 1000 or an elbow fitting 1002 including an outlet 1004 positioned at a right angle from the inlet 142. The outlet 1004 includes threads 1008 that are configured to attach to at least one of a hose, a flexible connector, or a fitting. The external threading allows for a variety of connections to be made with ease. The compression style valve 1000 includes at least one of metal or plastic and is configured to be one of at least a quarter turn shutoff valve or a multi-turn valve.

Figure 11A:
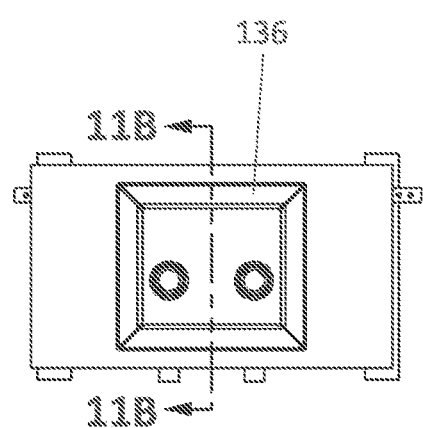
FIG. 11A is a front view of the outlet box assembly of FIG. 9.
Figure 11B:
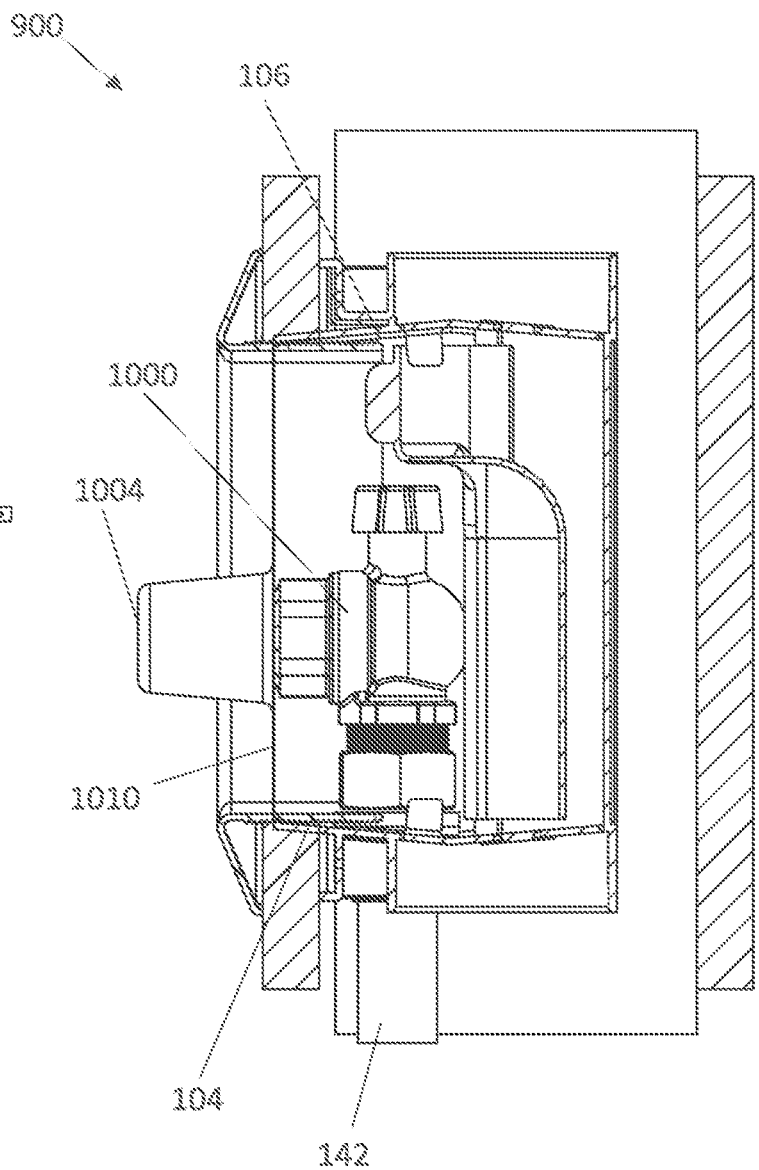
FIG. 11B is a cross-sectional view through section 11B-11B of FIG. 11A

FIGS. 11A-11B show the outlet box assembly 900 that includes the compression style valve 1000 that includes the outlet 1004 positioned at a right angle from the inlet 142 and is configured to extend beyond a third wall portion 1010 connected to both of the first wall portion 104 and the second wall portion 106 and the frame 136.

Figure 12:
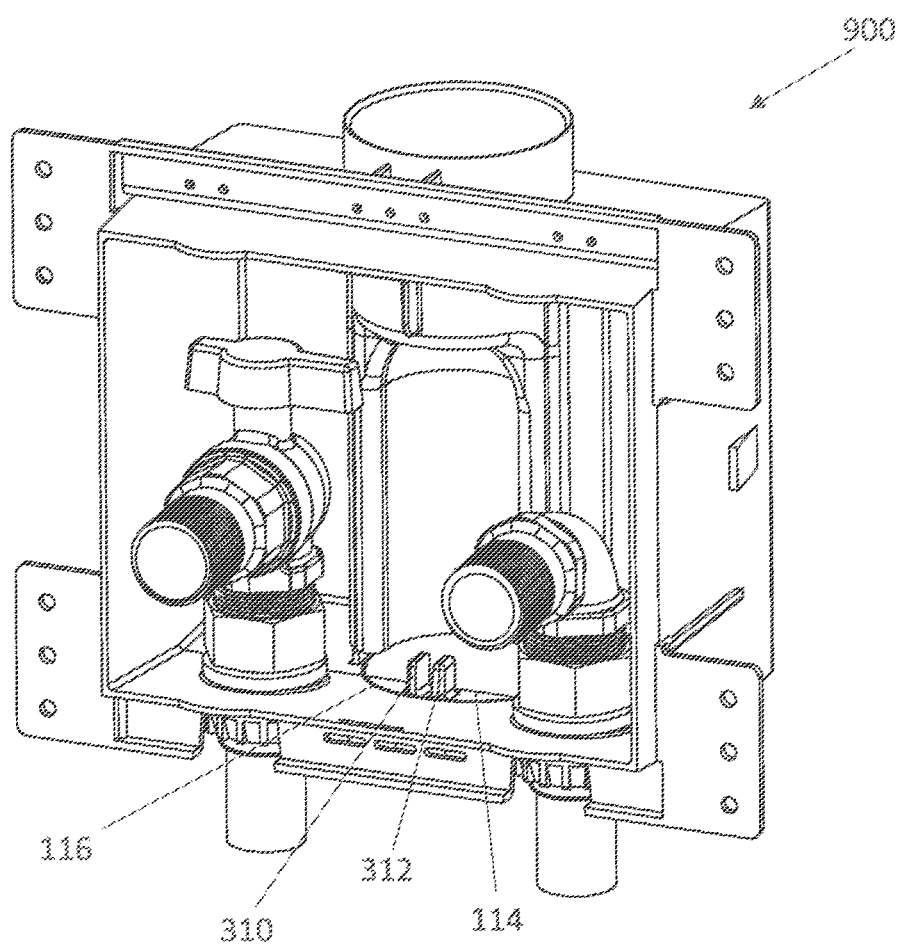
FIG. 12 is a perspective view of a valve and elbow assembly of the outlet box assembly of FIG. 9.

FIG. 12 shows the outlet box assembly 900 that includes the first knock out body 114 that includes a first extending tab 310 and a second extending tab 312 projected inside of the outlet box assembly 900. The first extending tab 310 and the second extending tab 312 are configured to introduce stress when compressed together to the area (or line) of weakening 116 which causes the area (or line) of weakening 116 to fracture. The fracture allows for the removal of the first knock out body 114.

Figure 13:
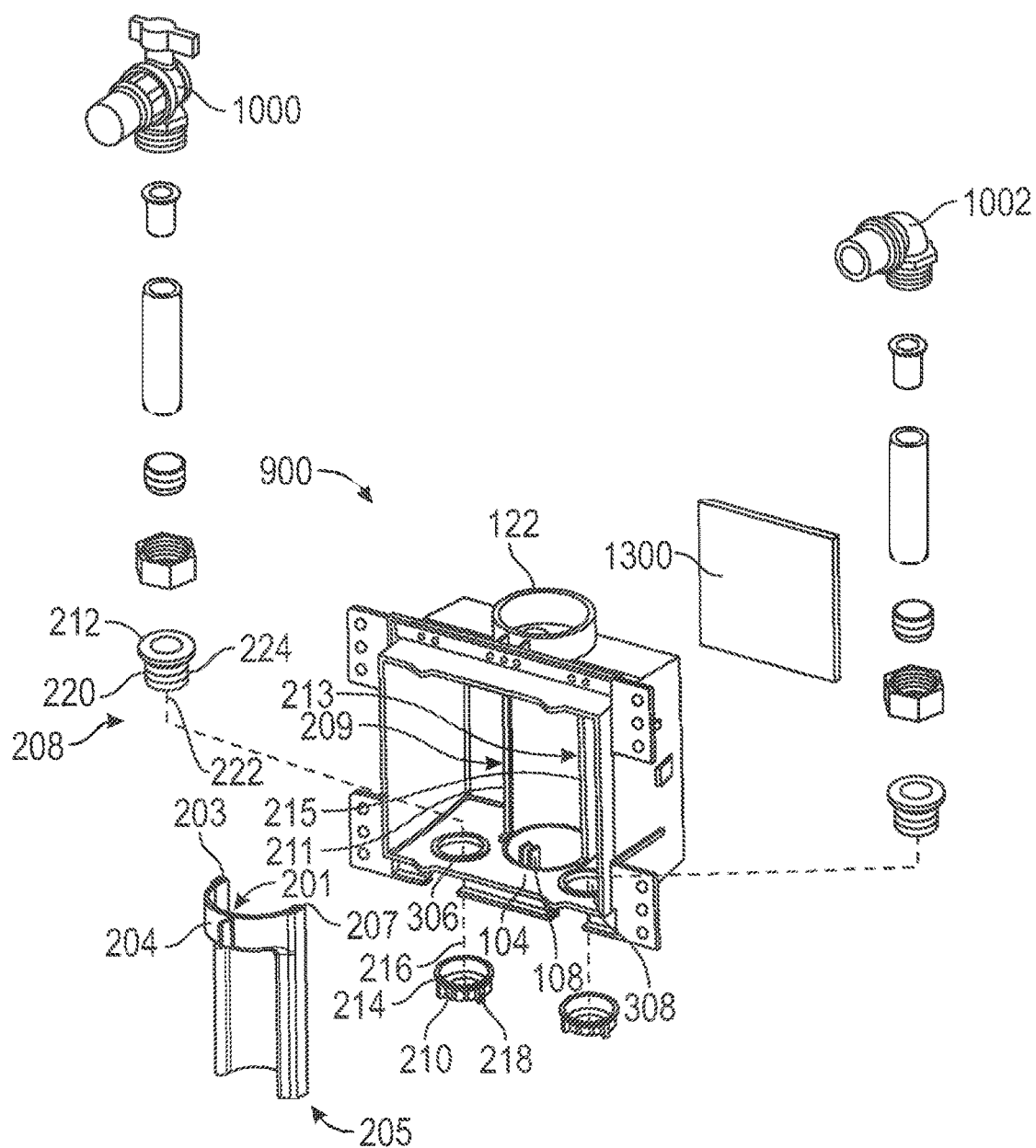
FIG. 13 is an exploded view of a valve and elbow assembly of the outlet box assembly of FIG. 9.

FIG. 13 shows the outlet box assembly 900 that includes the collet assembly 208. The collet assembly 208 includes a nut 210 and a collet body 212. The nut 210 includes an inner surface 214 that defines a passage 216 with one or more internal threads 218 positioned along the inner surface 214. The collet body 212 includes one or more external threads 220 that are configured to engage with the one or more internal threads 218 of the nut 210. The collet body 212 defines a longitudinally-extending collet body through hole 222 that is configured to receive at least one compression style valve 1000 or elbow fitting 1002. The collet body 212 further defines at least one longitudinal slot 224 that is configured to allow the collet body 212 to radially compress when the collet body 212 is attached to the nut 210. Further, a rear wall 1300 may be made of a fire rated material.

Further, in some implementations, the outlet box assembly 900 includes the first wall portion 104 that includes a first through hole 306 and a second through hole 308 which are configured to facilitate attachment of at least one compression style valve 1000 or elbow fitting 1002 to the first wall portion 104. The first through hole 306 and the second through hole 308 are positioned on the same wall portion or on the opposite wall portion as the socket portion (either the first socket portion 108 or the second socket portion 122) to which the funnel cover 204 is directing fluid.

FIGS. 14A-14B show an outlet box assembly 1400 according to another embodiment that includes an elastomeric gasket 1404 rather than a collet assembly 208. The outlet box assembly 1400 includes a valve assembly 1402 including a plumbing fitting 120 that is configured to attach to a first wall portion 104 by an elastomeric gasket 1404. The elastomeric gasket 1404 includes a longitudinally-extending through hole 1406 configured to radially compress the plumbing fitting 120. The elastomeric gasket 1404 is also configured to reduce the transmission of vibration from a plurality of pipes installed in the wall to the elastomeric gasket 1404. The elastomeric gasket 1404 is positioned on one side of collet body 212, with a liner 1412, sleeve 1414 receiving the liner 1412 and threaded nut 210 being provided on a same side of the gasket 1404 as the collet body 212. On an opposite side of the elastomeric gasket 1404 from the collet body 212, the elastomeric gasket 1404 is disposed to abut against a hex nut 1410 which is configured to receive washer 1408 as shown in FIG. 14A.

With reference to FIG. 9, FIG. 10, and FIG. 14A, another embodiment includes the outlet box assembly 900 having an outlet box housing 102. The outlet box housing 102 includes at least one hole 306 that is configured to facilitate attachment of a plumbing fitting 120. The outlet box housing 102 also includes an elastomeric gasket 1404 of sufficient thickness and material properties such as hardness, stiffness and shock absorptivity to isolate the plumbing fitting 120 and reduce transmission of noise and/or vibration. For example, the gasket 1404 may have a predetermined thickness and a predetermined stiffness. In addition, the plumbing fitting 120 is configured to attach to the first wall portion 104 by a collet fitting assembly 208. Additionally, as seen in FIG. 10 for example, the plumbing fitting has at least one compression inlet 142 for the connection of a plumbing tube.

Referring again to FIG. 9, FIG. 10, and FIG. 14A, the outlet box housing 102 includes at least a pair of holes 306 and 308 configured to facilitate attachment of plumbing fittings 120 with outlet ends 1004 substantially perpendicular to the inlet ends 142. Outlet sides 1014 of the plumbing fittings 120 may be provided with ¾" or larger male tapered threads 1008, although various embodiments may utilize other dimensions and/or threading. For example, the threads may be ¾" to 1," or larger. In some embodiments, one plumbing fitting 120 is provided with an elbow fitting 1002 and the other plumbing fitting 120 is provided with a valve 1000. Further, the outlets 1004 of the plumbing fittings 120 extend beyond the cavity created by the outlet box housing 102 for accessibility in attaching the plumbing fitting 120 to the plumbing elbow fitting 1002. In particular, by allowing the outlets 1004 to extend so as to project outwardly beyond a perimeter of the housing 102, the outlets 1004 may be readily reached, aiding in ease of use.

Figure 15:
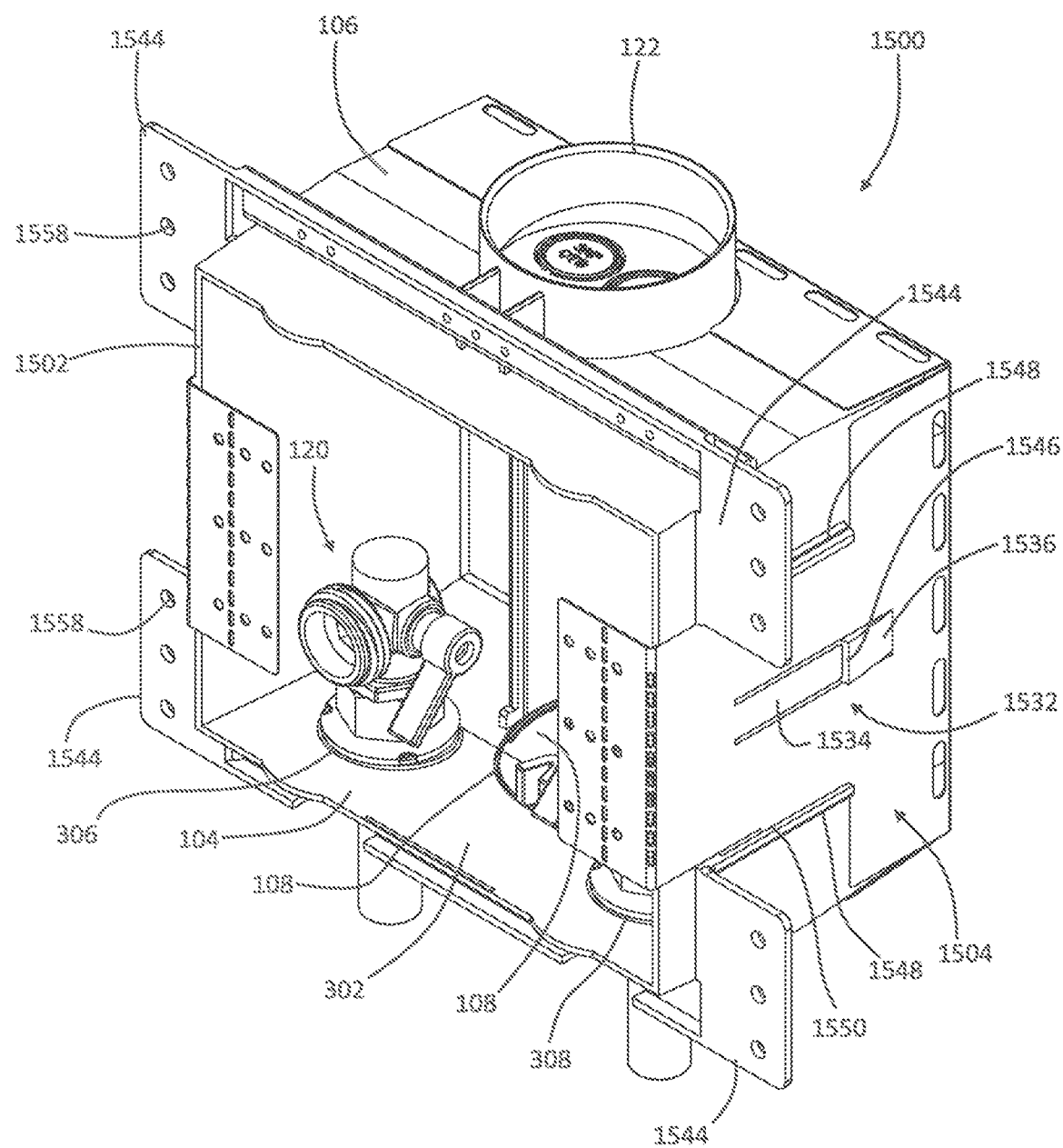
FIG. 15 is a perspective view of an outlet box assembly according to another embodiment.

Turning to FIG. 15, an outlet box assembly 1500 is depicted according to another embodiment of the present disclosure. The outlet box assembly 1500 includes an outlet box housing 1502. The outlet box housing includes a first wall portion 104 and a second wall portion 106. The outlet box assembly 1500 is shown in a first orientation in which the first wall portion 104, and therefore the first through hole 306 and the second through hole 308, are located on the bottom wall 302 of the outlet box assembly 1500 similar to the orientation of the outlet box assemblies 100, 900. It will be appreciated that the outlet box assembly 1500 may be configured in the second orientation in which the first wall portion 104 defines a top wall 304 of the outlet box housing 1502 and the second wall portion 106 defines the bottom wall 302 of the outlet box housing 1502 similar to the outlet box assembly 700 shown in FIGS. 8A-8E. In some implementations, the outlet box housing 1502, including the first wall portion 104, the second wall portion 106, and the surface of the outlet box assembly 1500, are internally sloped to direct any fluid that may enter the outlet box assembly 1500 to drain toward at least one of a first socket portion 108 or a second socket portion 122. The extent of sloping/tapering may vary depending on various installation configurations.

The outlet box assembly 1500 may have one or more parts of the outlet box assemblies 100, 700, 900, 1400 described above. To the extent that the embodiments are similar, the description will not be repeated although certain part numbers may be shown in the Figures. Instead, the description will be directed to the primary differences. Specifically, the outlet box assembly 1500 differs in how the outlet box assembly 1500 includes an intumescent fire wrap support bracket 1504 that is coupled to the outlet box housing 1502. The intumescent fire wrap support bracket 1504 may be comprised of a metal material.

Figure 16:
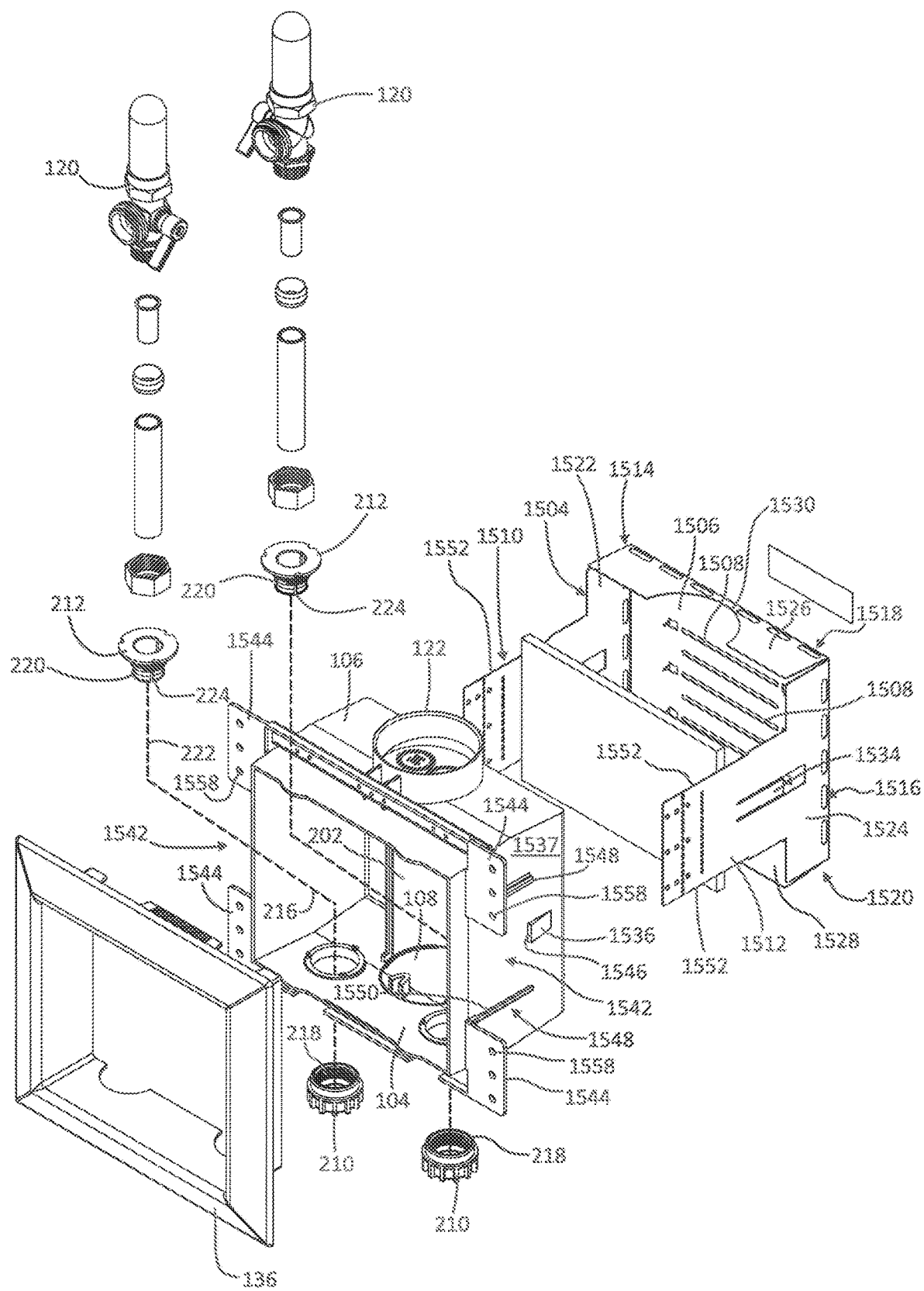
FIG. 16 is an exploded view of the outlet box assembly of FIG. 15 showing an outlet box housing and an intumescent fire wrap support bracket.

Turning to FIG. 16, an exploded view of the outlet box assembly 1500 is depicted. The intumescent fire wrap support bracket 1504 includes a rear or back wall 1506 that defines a plurality of slots 1508 and first and second opposing arms 1510, 1512. The intumescent fire wrap support bracket 1504 has a first side 1514 (e.g., left side), a second side 1516 (e.g., right side), a third side 1518 (e.g., top side) and a fourth side 1520 (e.g., bottom side). The first arm 1510 can be positioned at the first side 1514 and the second arm 1512 can be positioned at the second side 1516.

Figure 17:
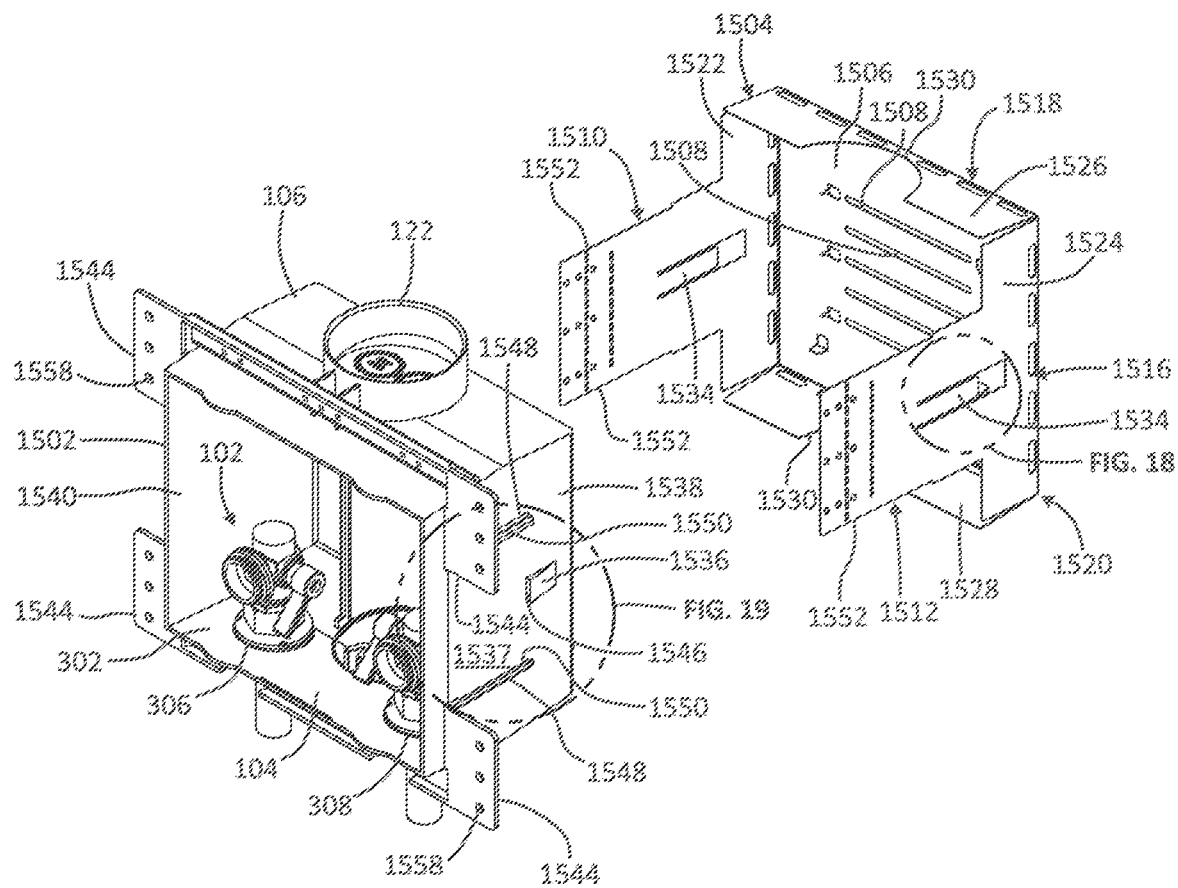
FIG. 17 is a perspective view of the outlet box assembly of FIG. 15 with the intumescent fire wrap support bracket exploded away from the outlet box housing.

Referring to FIG. 17, the intumescent fire wrap support bracket 1504 is shown exploded away from the outlet box housing 1502. The intumescent fire wrap support bracket 1504 may include a first flap 1522 at the first side 1514, a second flap 1524 at the second side 1516, a third flap 1526 at the third side 1518 and a fourth flap 1528 at the fourth side 1520. The first and second arms 1510, 1512 may extend perpendicularly from the back wall 1506 via the first and second flaps 1522, 1524. The first, second, third, and forth flaps 1522, 1524, 1526, and 1528 are shown in a mounting configuration in preparation of being installed into a wall. The third and fourth flaps 1526, 1528 may each define a cutout 1530 (e.g., a recess). The cutouts 1530 defined in the respective third and fourth flaps 1526, 1528 may be shaped and sized to clip-on over the first and second socket portions 108, 122 when the intumescent fire wrap support bracket 1504 is coupled to the outlet box housing 1502. The first, second, third, and forth flaps 1522, 1524, 1526, and 1528 may be foldable with respect to the back wall 1506 such that the intumescent fire wrap support bracket 1504 may be shipped in a flat orientation.

Figure 18:
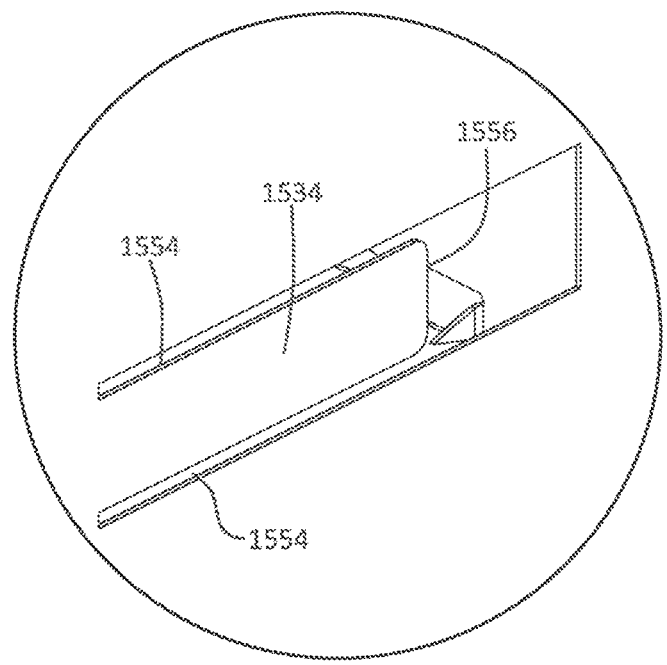
FIG. 18 is an enlarged view of a portion of FIG. 17 depicting a latch.
Figure 19:
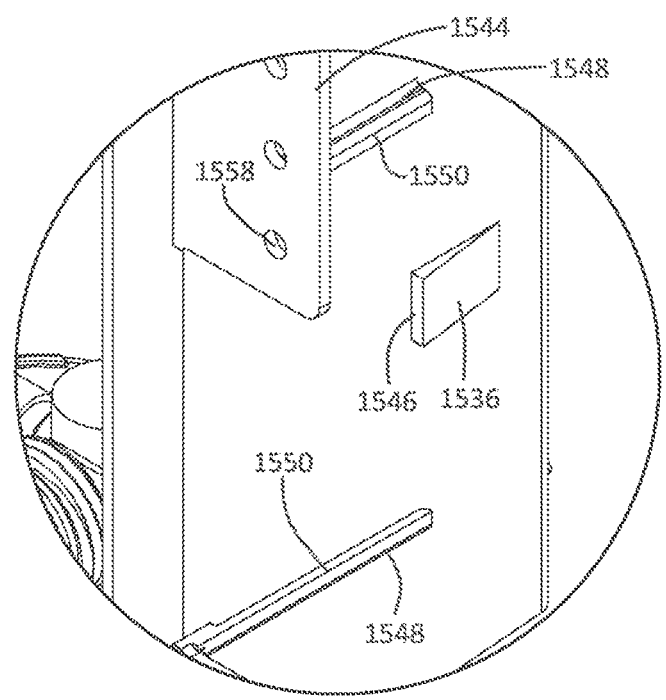
FIG. 19 is an enlarged view of a portion of FIG. 17 depicting a latch tab.

The intumescent fire wrap support bracket 1504 can be attached (e.g., secured, coupled) to the outlet box housing 1502 via a latch mechanism 1532 (see FIG. 15). As depicted in FIGS. 18-19, the latch mechanism 1532 may include a latch 1534 on the first and second arms 1510, 1512 of the intumescent fire wrap support bracket 1504 and a latch tab 1536 (e.g., a retention element) located on outer surfaces 1537 of first and second sides 1538, 1540 of the outlet box housing 1502. As such, the latch 1534 and the latch tab 1536 can make an interfering lock that creates the latch mechanism 1532. When the intumescent fire wrap support bracket 1504 is attached to the outlet box housing 1502, the first and second arms 1510, 1512 can slide within respective openings 1542 defined between bracket members 1544 of the outlet box housing 1502. The latch 1534 may slide over a ramp surface of the latch tab 1536 until the latch 1534 snaps in engagement with a snap-ft edge 1546 of the latch tab 1536. That is, the latches 1534 may releasably interlock with the respective latch tabs 1536.

The first and second sides 1538, 1540 of the outlet box housing 1502 may each include rail elements 1548 that define channels 1550 therealong. In the example depicted, the rail elements 1548 are shown on the first side 1538 and although the second side 1540 is not visible, the same configuration is provided on the second side 1540. There are two opposing rail elements 1548 on the outer surfaces 1537 of the first and second sides 1538, 1540 of the outlet box housing 1502. The channels 1550 of the rail elements 1548 can be configured to receive opposing edges 1552 of the respective first and second arms 1510, 1512 for proper positioning in the openings 1542 when the intumescent fire wrap support bracket 1504 is mounted to the outer box housing 1502.

Still referring to FIG. 18, the latch 1534 may be defined by slits 1554 formed through the first and second arms 1510, 1512 to act as a flexible latch. A distal end 1556 of the latch 1534 abuts the snap-fit edge 1546 of the latch tab 1536 to secure the intumescent fire wrap support bracket 1504 to the outlet box housing 1502.

The bracket members 1544 are shown at the first and second sides 1538, 1540 of the outlet box housing 1502 at the top and bottom sides thereof. The bracket members 1544 may include fastener openings 1558 for receiving fasteners (not shown) to mechanically mount the outlet box assembly 1500 to a wall.

Figure 20:
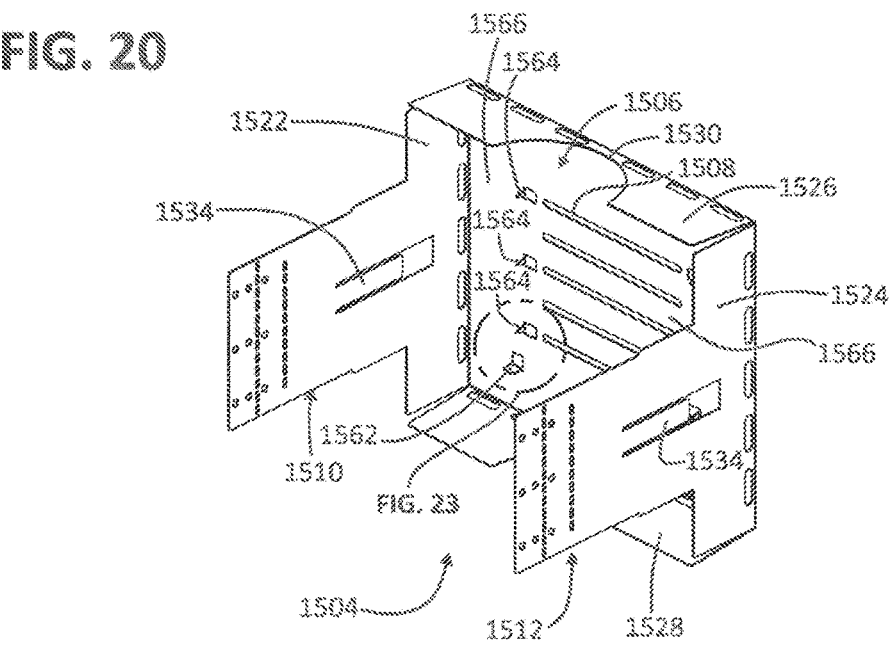
FIGS. 20-22 are multiple perspective views of the intumescent fire wrap support bracket of FIG. 17.
Figure 21:
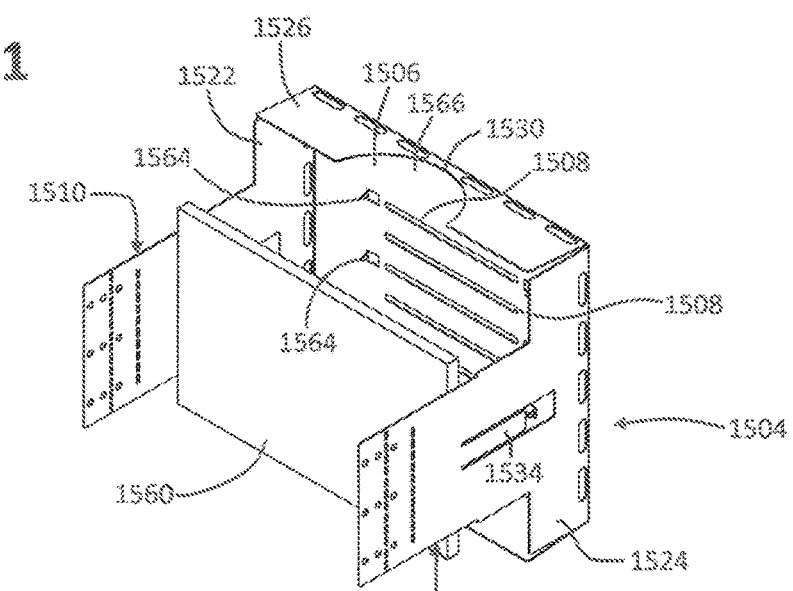
Figure 22:
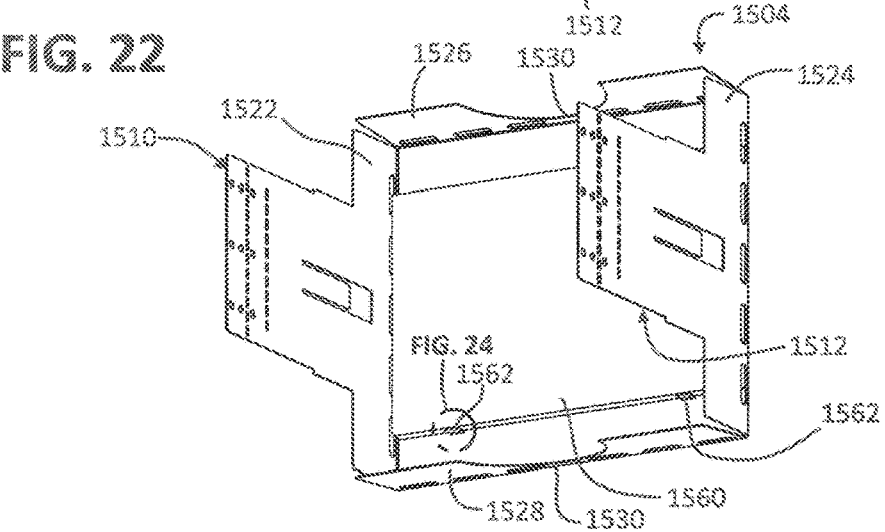

Turning to FIGS. 20-22, the intumescent fire wrap support bracket 1504 is shown with an intumescent material 1560. The intumescent material 1560 is designed to mount on the backwall 1506 of the intumescent fire wrap support bracket 1504. Specifically, the intumescent material 1560 is placed on an inner surface 1566 of the backwall 1506. The backwall 1506 includes intumescent locating tabs 1562 and puncturing elements 1564 for securing the intumescent material 1560 to an inner surface 1566 of the backwall 1506 of the intumescent fire wrap support bracket 1504.

Figure 23:
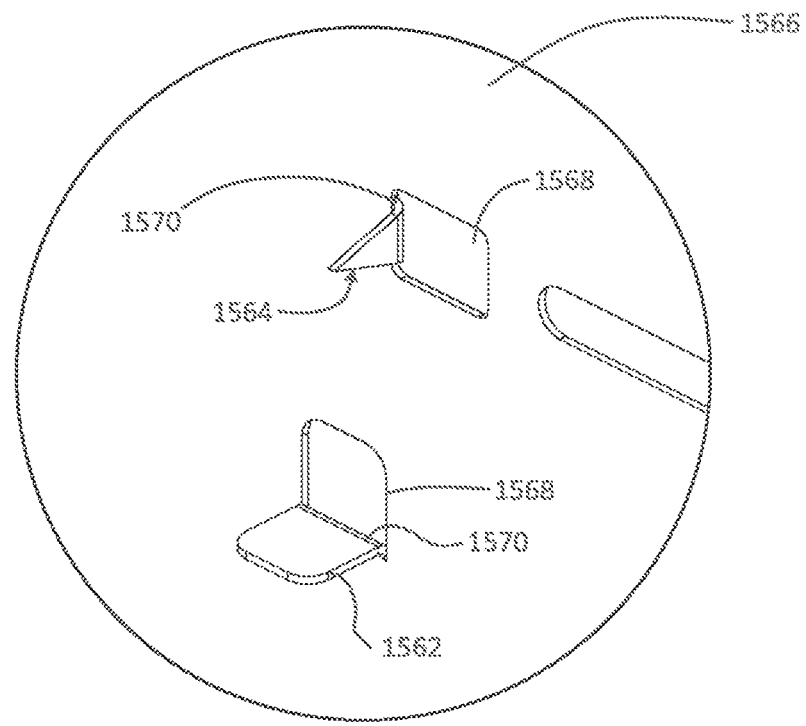
FIG. 23 is an enlarged view of a portion of FIG. 20.
Figure 24:
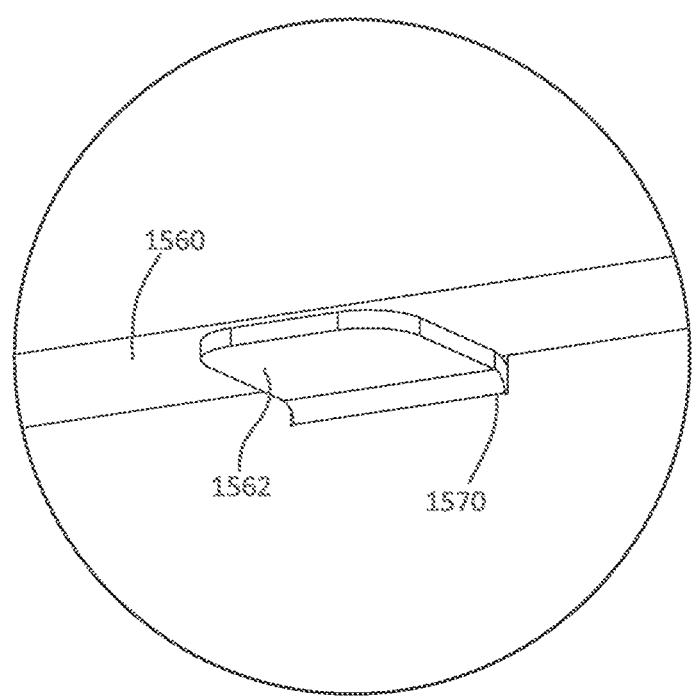
FIG. 24 is an enlarged view of a portion of FIG. 22.

FIGS. 23-24 are enlarged views of the intumescent locating tabs 1562 and the puncturing elements 1564. The intumescent fire wrap support bracket 1504 can be punched or stamped to create cutouts 1568 in the backwall 1506. When the intumescent fire wrap support bracket 1504 is punched, the intumescent locating tabs 1562 and the puncturing elements 1564 are created. The cutouts 1568 each have an edge 1570 that allow the intumescent locating tabs 1562 and the puncturing elements 1564 to extend outwardly therefrom toward the inner surface 1566 of the backwall 1506. The intumescent locating tabs 1562 of the intumescent fire wrap support bracket 1504 bend along the edge 1570 for respectively retaining, securing, or locating the intumescent material 1560 on the intumescent fire wrap support bracket 1504. For example, the intumescent locating tabs 1562 can be stamped to bend along the edge 1570 to extend outwardly from the inner surface 1566 of the intumescent fire wrap support bracket 1504 to support the intumescent material 1560 adjacent the inner surface 1566 of the backwall 1506. Furthermore, the puncturing elements 1564 may be configured to extend outwardly relative to the inner surface 1566. As such, when the intumescent material 1560 is mounted on the intumescent locating tabs 1562 of the intumescent fire wrap support bracket 1504, the puncturing elements 1564 may puncture the intumescent material 1560 to help secure the intumescent material 1560 thereon.

In certain examples, the intumescent material 1506 may have a pre-shaped structure in the form of an intumescent pad, although alternatives are possible. The intumescent pad can include a protective liner that is removable to expose an adhesive backing which permits the intumescent material 1560 to be secured to the inner surface 1566 of the backwall 1506. As such, the outlet box assembly 1500 may be easily assembled in the field. The protective liner can be made from a film material formed from polyethylene or the like. The intumescent material may be constructed in accordance with U.S. Patent Application No. 63/229,314. The disclosure in the aforementioned U.S. Patent Application No. 63/229,314 is hereby incorporated herein in its entirety by this reference thereto. However, it should be understood that the intumescent material 1560 may have a construction which is different than the construction of the intumescent described in U.S. Patent Application No. 63/229,314.

It is advantageous to have an intumescent material disposed adjacent to an access opening such that the intumescent material can expand to fill in holes when heated by a fire to close off penetration made by outlet box assemblies. The outlet box assembly 1500 may be mounted directly to a wall within a through-hole extending through the wall. The intumescent material 1560 can fill the gap between the wall and the outlet box assembly 1500 to ensure a complete seal when the outlet box assembly 1500 is completely assembled and attached to the wall. The intumescent material 1560 is designed to expand to fill in holes when heated by a fire to close off penetration made by outlet box assemblies. As such, when the intumescent material 1560 becomes hot, it will expand rapidly into the open areas around it but still remain kept inside the intumescent fire wrap support bracket 1504. That is, the advantageous features of the intumescent fire wrap support bracket 1504 according to the present disclosure is the ability to control or contain the expansion of the intumescent material 1560 when exposed to heat. The first flap 1522, second flap 1524, third flap 1526 and fourth flap 1528 of the intumescent fire wrap support bracket 1504 are similar to ledges that keep the intumescent material 1560 in place on the intumescent fire wrap support bracket 1504. When the temperature rises near a wall surface, the intumescent material 1560 will heat up and char when exposed to flames. When the intumescent material 1560 becomes hot enough, it will quickly expand to multiple times its original volume. This expansion will help to create a barrier, or seal, substantially preventing fire, heat, and smoke from moving from one area of a building to another for at least some period of time. Having the intumescent material 1560 disposed within the intumescent fire wrap support bracket 1504 improves the fire-stopping performance as the intumescent expands to fill in holes and close off the hole for the outlet box assembly 1500. The intumescent fire wrap support bracket 1504 is configured to prevent the intumescent material 1560 from falling behind the wall which may hinder performance.

Figure 25:
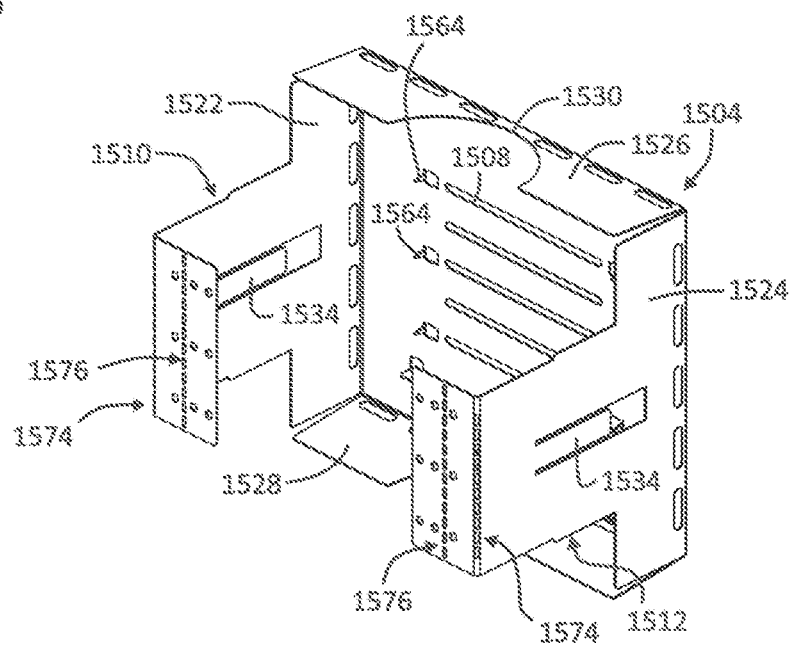
FIG. 25 is a perspective view of the intumescent fire wrap support bracket of FIG. 17 showing distal end tabs.
Figure 26:
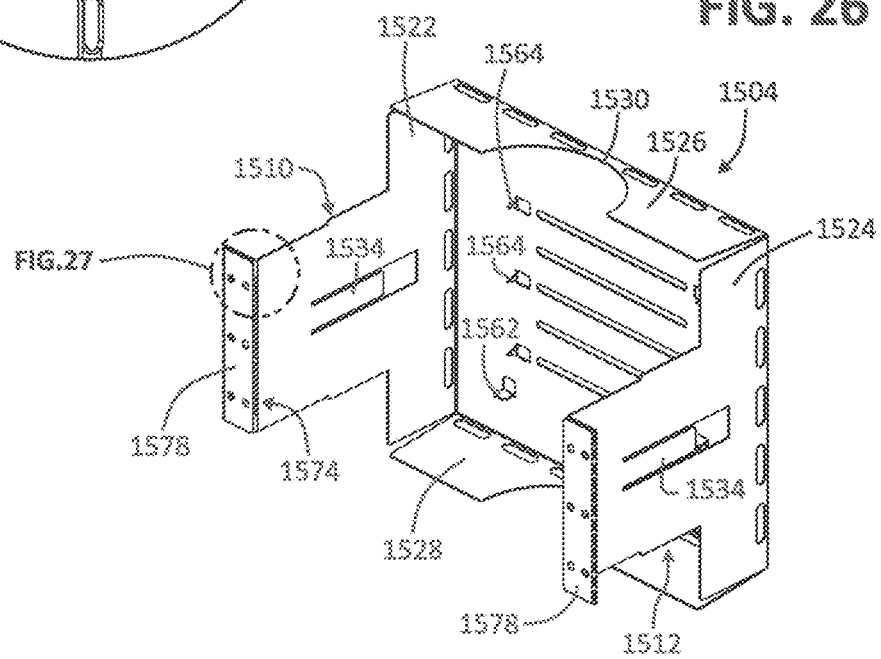
FIG. 26 is a perspective view of the intumescent fire wrap support bracket of FIG. 25 showing the distal end tabs in a first folded position for mounting within a single wall structure.

FIGS. 25-26 depict the intumescent fire wrap support bracket 1504 of the outlet box assembly 1500. The outlet box assembly 1500 with the intumescent fire wrap support bracket 1504 is designed to be pushed through drywall 1572, i.e., sheet rock. In certain examples, the drywall 1572 may include a single layer of sheet rock or a double layer of sheet rock. Typically, the drywall is ⅝ inches thick. As such, a double layer of drywall would be twice as thick. The intumescent fire wrap support bracket 1504 is designed to be used in both single or double wall applications.

Figure 28:
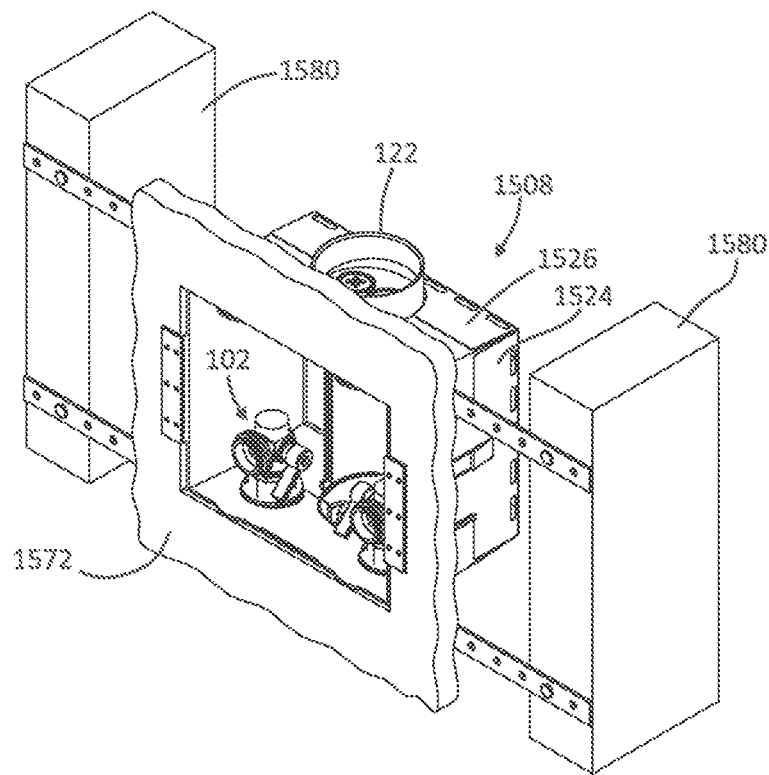
FIG. 28 is a perspective view of the outlet box assembly of FIG. 15 mounted to a single wall with studs.
Figure 29:
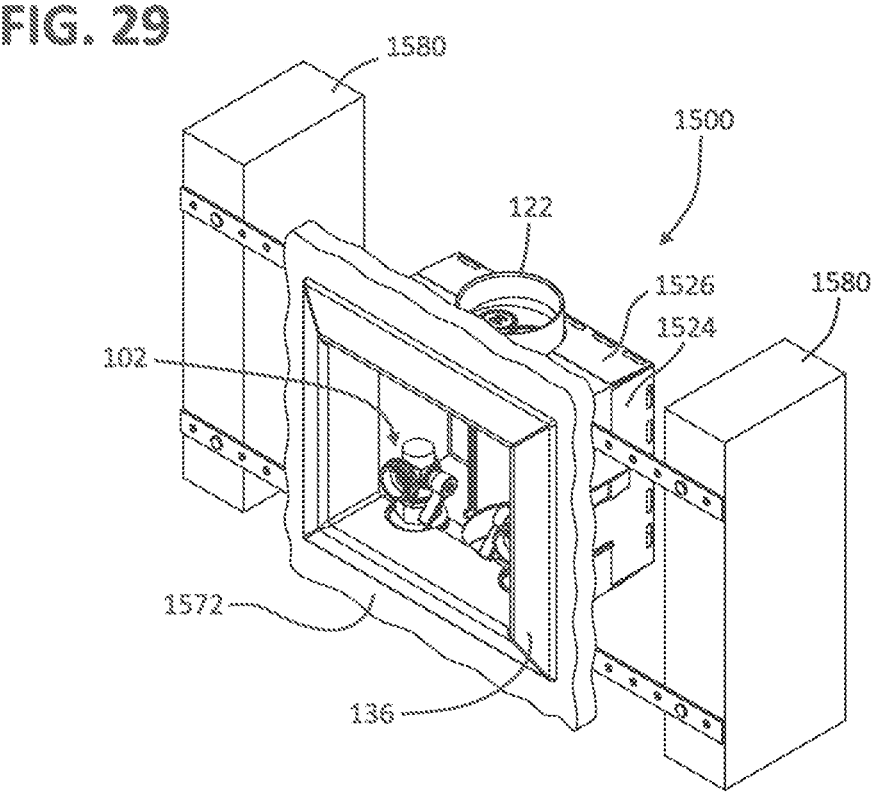
FIG. 29 is a perspective view of the outlet box assembly of FIG. 28 including a cover.
Figure 32:
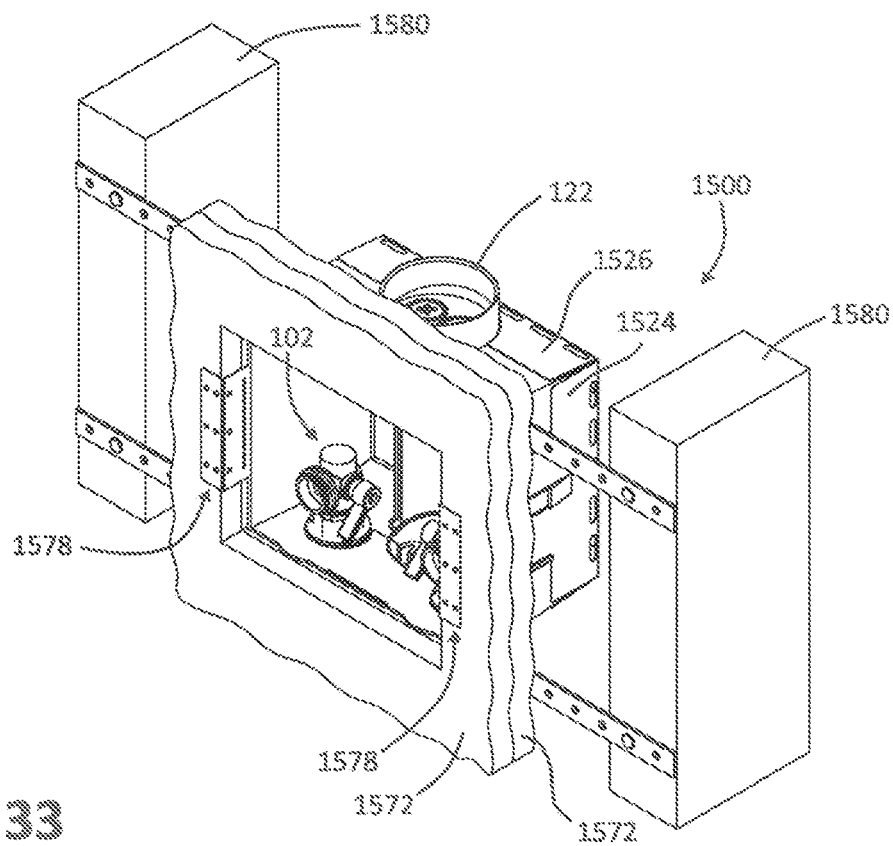
FIG. 32 is a perspective view of the outlet box assembly of FIG. 15 mounted to a double wall with studs.
Figure 33:
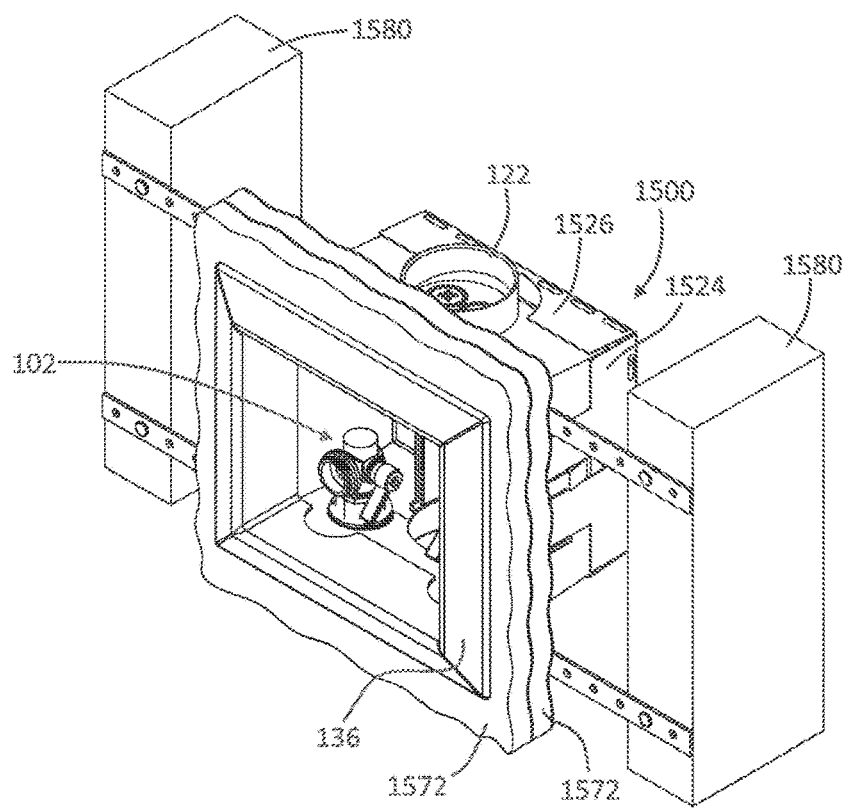
FIG. 33 is a perspective view of the outlet box assembly of FIG. 32 including a cover.

The first and second arms 1510, 1512 of the intumescent fire wrap support bracket 1504 may each include first and second perforated (e.g., pierced, punctured, holed, slotted, creased) lines 1574, 1576 at a distal end thereof. When bending along both the perforated lines 1574, 1576, tabs 1578 can be created. This double folded configuration can be used in a single drywall 1572 application as shown in FIG. 28. That is, the tabs 1578 may be mounted on the outside to capture a single layer of drywall 1572 when the outlet box assembly 1500 is inserted into the drywall 1572. FIG. 29 shows the complete assembly of the outlet box assembly 1500 with optional studs 1580 and the cover 136 attached.

Figure 27:
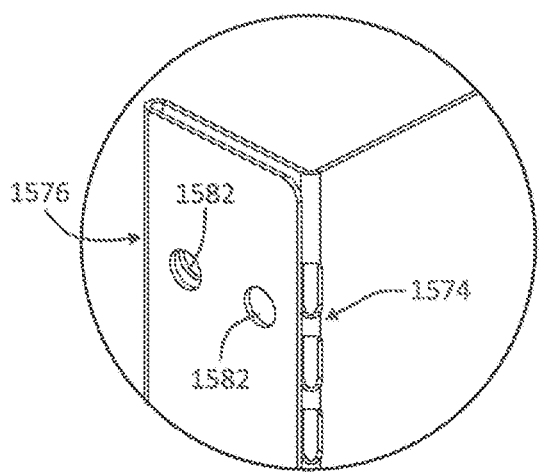
FIG. 27 is an enlarged view of a portion of FIG. 26.

In certain examples, the outlet box assembly 1500 may be mounted within a double layer of sheet rock. As such, the tabs 1578 may be adjusted for the thicker wall. A single fold may be provided along the first perforated fold region 1574 to create the tabs 1578 as depicted in FIGS. 29-31. Accordingly, the first and second arms 1510, 1512 are longer for the thicker wall than for the single or thinner wall. The tabs 1578 may also include openings 1582 (see FIG. 27) for mechanical attachment to the wall 1572.

Each of the various implementations disclosed herein may have any of the aspects, features, components, and configurations of the other implementations, except where noted otherwise. For example, each of the various features, components, and aspects of the outlet box assemblies 100, 700, 900, and 1500 can be integrated into any of the other implementations of the outlet box assemblies 100, 700, 900, and 1500.

As utilized herein, the term "approximately" and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary implementations, and that such variations are intended to be encompassed by the present disclosure.

It is important to note that the construction and arrangement of the various exemplary implementations are illustrative only. Although only a few implementations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative implementations. Other substitutions, modifications, changes and omissions may also be made in the design, operating conditions and arrangement of the various exemplary implementations without departing from the scope of the present invention.

What is claimed is:

1. An outlet box assembly comprising:
    an outlet box housing including:
        a first wall portion comprising:
            a first socket portion configured for receipt of at least a portion of a conduit, the first socket portion comprising a first knock out portion comprising a first knock out body and an area of weakening, the first socket portion disposed to connect the first knock out body to the first wall portion, the area of weakening configured to facilitate removal of the first knock out body from the first wall portion; and
            at least one through hole configured to facilitate attachment to a plumbing fitting;
        a collet assembly configured to attach the plumbing fitting to the outlet box housing, the collet assembly comprising:
            a nut comprising an inner surface that defines a passage with one or more internal threads positioned along the inner surface;
            a collet body with one or more external threads configured to engage with the one or more internal threads of the nut, the collet body defining a longitudinally-extending collet body through hole configured to receive the plumbing fitting, the collet body further defining at least one longitudinal slot configured to allow the collet body to radially compress when the collet body is attached to the nut; and
        a second wall portion comprising:
            a second socket portion configured for receipt of at least a portion of a tubing, the second socket portion comprising a second knock out portion comprising a second knock out body and an area of weakening, the second socket portion disposed to connect the second knock out body to the second wall portion;
    wherein the outlet box housing is configurable between (i) a first orientation in which the first wall portion defines a bottom wall of the outlet box housing and the second wall portion defines a top wall of the outlet box housing, and (ii) a second orientation in which the second wall portion is positioned opposite the first wall portion, the second wall portion defining a bottom wall of the outlet box housing and the first wall portion defining a top wall of the outlet box housing; and
    wherein the outlet box housing further comprises a funnel assembly including a funnel portion having a first end fixed on the first wall portion such that the funnel portion is stationary with respect to the outlet box housing, the funnel portion extending from the first wall portion to the second wall portion and a funnel cover configured to be removably attached to the funnel portion such that the funnel cover extends from the first wall portion to the second wall portion.

2. The outlet box assembly of claim 1, wherein the first wall portion also comprises a second through hole configured to receive at least one of a compression style valve or an elbow fitting comprising an outlet positioned at a right angle from an inlet.

3. The outlet box assembly of claim 2, wherein the outlet comprises a plurality of threads configured to attach to at least one of a hose, a flexible connector, or a fitting, wherein the plurality of threads are configured to extend beyond a third wall portion connected to both of the first wall portion and the second wall portion and a frame.

4. The outlet box assembly of claim 2, wherein the compression style valve comprises of at least one of metal or plastic and is configured to be one of at least a quarter turn shutoff valve or a multi-turn valve.

5. The outlet box assembly of claim 1, wherein the funnel assembly defines an opening configured to allow passage of at least a portion of a conduit into the outlet box housing, and configured to direct fluid flow to the first socket portion or the second socket portion.

* * * * *